(12) United States Patent
Nakagawa et al.

(10) Patent No.: US 11,885,611 B2
(45) Date of Patent: *Jan. 30, 2024

(54) DETECTION DEVICE, PROCESSING DEVICE, EQUIPMENT, DETECTION METHOD, AND DETECTION PROGRAM

(71) Applicant: NIKON CORPORATION, Tokyo (JP)

(72) Inventors: Yoshihiro Nakagawa, Tokyo (JP); Taro Matsuo, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,991

(22) Filed: Feb. 2, 2023

(65) Prior Publication Data

US 2023/0194246 A1    Jun. 22, 2023

Related U.S. Application Data

(63) Continuation of application No. 16/889,668, filed on Jun. 1, 2020, now Pat. No. 11,593,956, which is a
(Continued)

(30) Foreign Application Priority Data

Nov. 30, 2017  (JP) .................................. 2017-231128

(51) Int. Cl.
*G01B 11/245*     (2006.01)
*G06T 7/50*       (2017.01)
(Continued)

(52) U.S. Cl.
CPC ............ *G01B 11/245* (2013.01); *G01B 11/22* (2013.01); *G01B 11/24* (2013.01); *G06T 7/50* (2017.01);
(Continued)

(58) Field of Classification Search
CPC ....... G01B 11/245; G01B 11/22; G01B 11/24; G06T 7/50; G06T 2007/10028; G06V 10/143; G06V 40/23
See application file for complete search history.

(56) References Cited

U.S. PATENT DOCUMENTS 6,285,474 B1    9/2001  Kawano et al.
6,603,867 B1    8/2003  Sugino et al.
(Continued)

FOREIGN PATENT DOCUMENTS

JP    2000-321050 A    11/2000
JP    2010-134546 A    6/2010

OTHER PUBLICATIONS

Apr. 4, 2023 Office Action issued in Japanese Patent App-iicaiicm No. 2022-079660.
(Continued)

*Primary Examiner* — Gregory M Desire
(74) *Attorney, Agent, or Firm* — Oliff PLC

(57) ABSTRACT

A detection device includes: a first detector which irradiates light onto the target object and detects light emitted from the target object; a first shape information generator which generates first shape information representing a first shape of the target object on the basis of a detection result of the first detector; and a second shape information generator which adds a second shape, which is based on information different from the detection result of the first detector, to the first shape, and which generates second shape information representing a shape including the first shape and the second shape.

16 Claims, 15 Drawing Sheets

Related U.S. Application Data continuation of application No. PCT/JP2018/042102, filed on Nov. 14, 2018.

(51) Int. Cl.
*G01B 11/22* (2006.01)
*G01B 11/24* (2006.01)
*G06V 10/143* (2022.01)
*G06V 40/20* (2022.01)

(52) U.S. Cl.
CPC ............ *G06V 10/143* (2022.01); *G06V 40/23* (2022.01); *G06T 2207/10028* (2013.01); *G06T 2207/10048* (2013.01)

(56) References Cited

U.S. PATENT DOCUMENTS

| | | | |
|---|---|---|---|
| 7,239,374 B2 | 7/2007 | Taniguchi et al. | |
| 8,363,929 B2 | 1/2013 | Kojima et al. | |
| 8,509,523 B2* | 8/2013 | Schamp | G06V 20/58 |
| | | | 382/104 |
| 8,994,659 B2 | 3/2015 | Mallinson | |
| 9,025,857 B2 | 5/2015 | Kotake et al. | |
| 9,613,406 B2* | 4/2017 | Chen | G01S 17/894 |
| 10,029,857 B2* | 7/2018 | Toshikiyo | B65G 43/08 |
| 10,293,252 B2* | 5/2019 | Yokokawa | A63F 13/843 |
| 10,295,335 B2* | 5/2019 | Umemura | G01B 11/303 |
| 10,311,624 B2 | 6/2019 | Mitchell et al. | |
| 10,372,226 B2* | 8/2019 | Dai | G06F 3/0304 |

OTHER PUBLICATIONS

Feb. 19, 2019 Search Report issued in International Patent Application No. PCT/JP2018/042102.
Jun. 22, 2021 Office Action issued in Japanese Patent Application No. 2019-557132.
May 11, 2022 Office Action issued in U.S. Appl. No. 16/889,668.
Oct. 28, 2022 Notice of Allowance issued in U.S. Appl. No. 16/889,668.

* cited by examiner

DETECTION DEVICE, PROCESSING DEVICE, EQUIPMENT, DETECTION METHOD, AND DETECTION PROGRAM

CROSS REFERENCE TO RELATED APPLICATION

This application is a Continuation of U.S. patent application Ser. No. 16/889,668, filed Jun. 1, 2020, which is a Continuation of PCT International Application No. PCT/JP2018/042102, filed on Nov. 14, 2018, the contents of which are incorporated herein by reference. This application claims the benefit of Japanese Patent Application No. 2017-231128, filed on Nov. 30, 2017, the contents of which are incorporated herein by reference.

FIELD OF THE INVENTION

The present invention relates to a detection device, a processing device, an equipment, a detection method, and a detection program.

BACKGROUND

A technique for detecting three-dimensional shape information of an object has been known (for example, see Patent Literature 1 (Japanese Unexamined Patent Application, First Publication No. 2010-134546)). A depth camera used in such a technique, for example, irradiates a target object with light such as infrared light and detects light emitted from the target object. It is desirable in the above technique that the loss of shape information of, for example, the target object is low.

CITATION LIST

Patent Literature

[Patent Literature 1] Japanese Unexamined Patent Application, First Publication No. 2010-134546

SUMMARY

According to a first aspect of the present invention, provided is a detection device comprising: a first detector which irradiates light onto the target object and detecting light emitted from the target object; a first shape information generator which generates first shape information representing a first shape of the target object on the basis of a detection result of the first detector; and a second shape information generator which adds a second shape, which is based on information different from the detection result of the first detector, to the first shape, and which generates second shape information representing a shape including the first shape and the second shape.

According to a second aspect of the present invention, provided is a processing device comprising: a first shape information generator which irradiates light onto the target object and detects light emitted from the target object; and a second shape information generator which adds a second shape, which is based on information different from the detection result of the first detector, to the first shape, and which generates second shape information representing a shape including the first shape and the second shape.

According to a third aspect of the present invention, provided is an equipment attached to an object, the equipment comprising: a first portion from which at least a part of light irradiated from a predetermined point is emitted toward the predetermined point; an identifier which is provided at a predetermined position in the first portion and is used to specify the first portion; and a second portion which is arranged at a predetermined relative position with respect to the first portion, and in which the amount of light emitted toward the predetermined point among the light irradiated from the predetermined point is smaller than that in the first portion.

According to a fourth aspect of the present invention, provided is a detection method comprising: detecting a depth from a predetermined point to each point on a surface of a target object by irradiating light onto the target object and detecting light emitted from the target object; generating first shape information representing a first shape of the target object on the basis of the detection result; and adding a second shape, which is based on information different from the depth obtained by the detection, to the first shape, and generating second shape information representing a shape including the first shape and the second shape.

According to a fifth aspect of the present invention, provided is a non-transitory computer readable medium, the medium including a detection program which causes a computer to execute processes including: generating first shape information representing a first shape of the target object, on the basis of a depth from a predetermined point to each point on a surface of a target object obtained by irradiating light onto the target object and detecting light emitted from the target object; and adding a second shape, which is based on information different from the depth serving as the base of the first shape information, to the first shape, and generating second shape information representing a shape including the first shape and the second shape.

DETAILED DESCRIPTION OF EMBODIMENTS

First Embodiment

Figure 1:
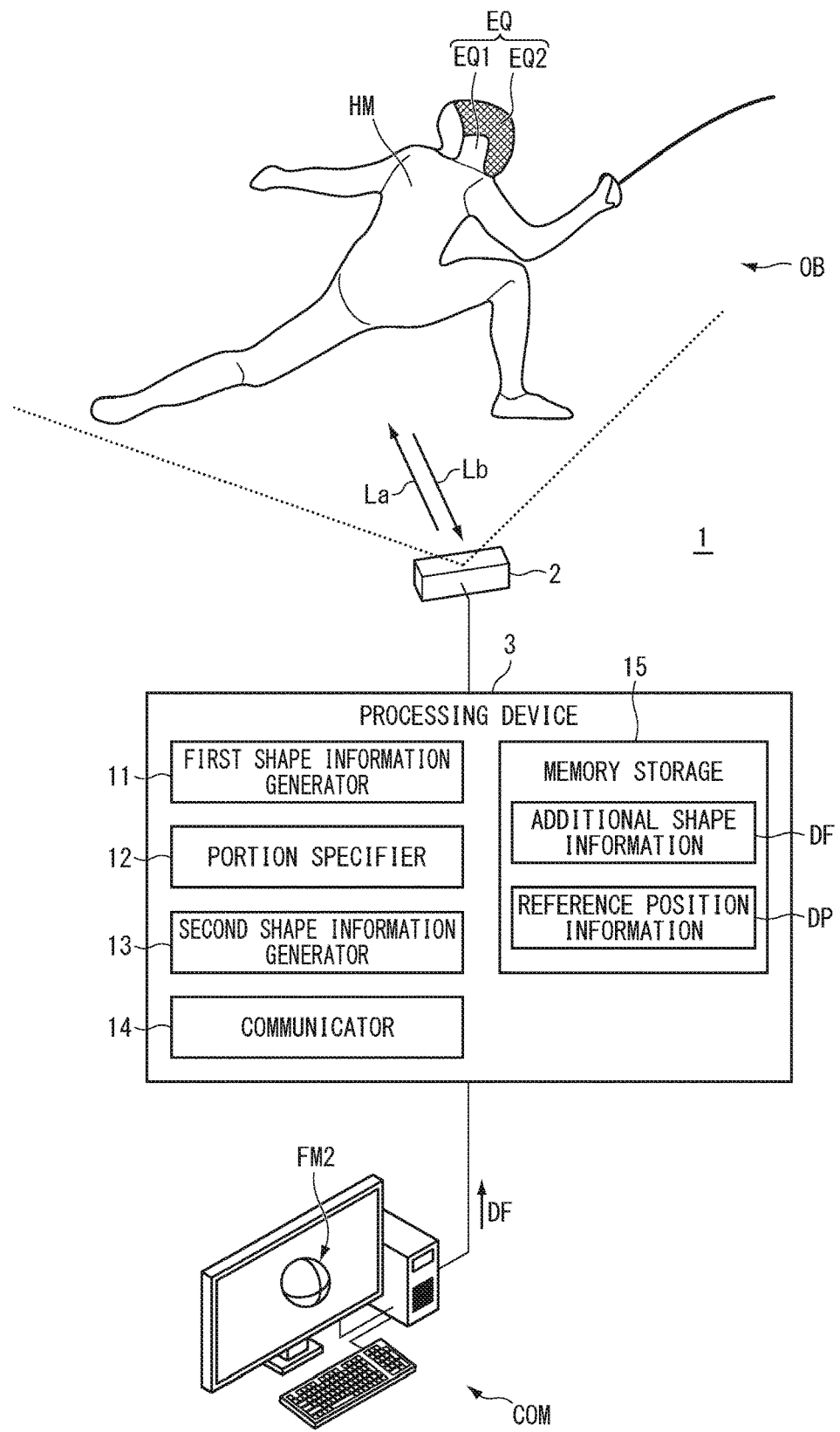
FIG. 1 is a diagram showing a detection device according to a first embodiment.

First, a first embodiment will be described. FIG. 1 is a diagram showing a detection device according to the first embodiment. A detection device 1 (detection system) includes a first detector 2 and a processing device 3. The first detector 2 irradiates light La onto a target object OB and detects light Lb emitted from the target object OB to thereby detect a depth from a predetermined point Vp to each point on the surface of the target object OB. The processing device 3 (processor) generates shape information which represents the shape of the target object OB on the basis of a detection result of the first detector 2.

The detection device 1 detects, for example, a human body HM in motion. For example, the detection device 1 detects the human body HM which moves in various types of activities such as sporting activities including fencing, baseball, soccer, golf, kendo, American football, ice hockey, gymnastics, running, and exercising, yoga, and bodybuilding, walking or posing at a fashion show, game playing activities, personal authentication activities, and work related activities. Here, an example of detecting the human body HM performing fencing is described.

The target object OB includes, for example, a human body HM and an equipment EQ attached to the human body HM. Examples of the equipment EQ include masks such as a fencing mask, a kendo mask or an American football mask (for example, protective masks, and masks having no or little change in shape (masks of known shapes)). The equipment EQ includes a first portion EQ1 and a second portion EQ2. The first portion EQ1 is a portion (part) which covers the neck of the human body HM. The first portion EQ1 is fixed to the human body HM (for example, head) and moves integrally with the human body HM. At least a part of the light La irradiated from the first detector 2 is reflected or scattered by the first portion EQ1, and the light reflected or diffused by the first portion EQ1, and the reflected light or the diffused light associated with the light La is emitted as light Lb toward the first detector 2. Therefore, the target object OB in the present embodiment includes at least one of the human body HM performing fencing (for example, a fencing athlete) and a fencing mask (the equipment EQ) attached to the human body HM. The equipment EQ is not limited to a mask, and may be a glove, a shoe, or a mesh-type uniform.

The second portion EQ2 is a portion which covers the front side of the head (face) of the human body HM. The second portion EQ2 includes, for example, a mesh portion (a viewing portion) so that the user (in this case, the wearer) can look forward through the second portion EQ2. The second portion EQ2 is integrated with the first portion EQ1, and the position thereof relative to the first portion EQ1 is determined (the position is known). The viewing portion (low reflection region) mentioned above is present in the second portion EQ2. Therefore, the amount of light reflected in the mesh portion is low when the light La is irradiated from the first detector 2, and the intensity of the light Lb emitted toward the first detector 2 is lower than that in the first portion EQ1 (high reflection region). Therefore, the second portion EQ2 is a region where optical characteristics of the surface thereof differ from those of the first portion EQ1 due to the difference in the surface structure.

The target object OB may be a human body HM to which the equipment EQ is not attached. The target object OB may include a non-human animal. The target object OB may include a plant. The target object OB may include an inanimate object such as a robot. The target object OB may include a non-moving object (a stationary object).

For the target object OB, there are some cases where conditions are known in advance under which acquisition of highly accurate detection results is difficult. In such a case, in the target object OB, a portion (part) in the target object OB where the accuracy of the detection result (depth) is assumed to be relatively low is known in advance. For example, in the target object OB, the second portion EQ2 of the equipment EQ includes a mesh portion, and the intensity of light Lb (an output signal) emitted from the target object OB is relatively lower (weaker) in the second portion EQ2 than in another portion (for example, the first portion EQ1). Thus, in the present embodiment, the light amount per unit area of the light Lb emitted from the second portion EQ2 is lower than the light amount per unit area of the light Lb emitted from the portion other than the second portion EQ2 in the target object OB.

The level of the detection signal indicating the detection result on the second portion EQ2 is lower than the level of the detection signal indicating the detection result related to the portion other than the second portion EQ2 in the target object OB, for example. Therefore, the accuracy of the detection result related to the second portion EQ2 is lower than the accuracy of the detection result related to the portion other than the second portion EQ2 in the target object OB, for example. The accuracy is represented, for example, by a numerical value within a predetermined range (for example, from 0 to 1 inclusive or from 0% to 100% inclusive). The accuracy indicates that the higher the numerical value, the higher the reliability of the information (the information is more likely to be reliable).

The processing device 3 according to the embodiment obtains shape information regarding, for example, a preliminarily-set set region on the target object OB, on the basis of information different from the detection result of the first detector 2. The set region (for example, the mesh portion) includes, for example, a portion in the target object OB in which detection accuracy is assumed (estimated or predicted) to be relatively low. The processing device 3 adds a second shape, which is based on the information different from the detection result of the first detector 2, to a first shape, which is based on the detection result of the first detector 2, and generates shape information of a shape including the first shape and the second shape (as described later in FIG. 4A to FIG. 4D).

For example, the detection device 1 according to the embodiment aligns the position of and replaces (or overlaps) the shape information of the portion in which the detection result accuracy is assumed to be relatively low, with the shape information obtained from the information different from the detection result (for example, known information generated prior to the detection, or shape information obtained by means of another technique). Thereby, the loss of the shape information of the target object OB can be reduced. The detection device 1 in the present embodiment can partially replace model information used for three-dimensional modeling the target object OB with highly accurate model information by means of a configuration described later. As a result, visibility of a rendered and generated three-dimensional model image is improved for the user. Hereinafter, each part of the detection device 1 will be described.

Figure 2:
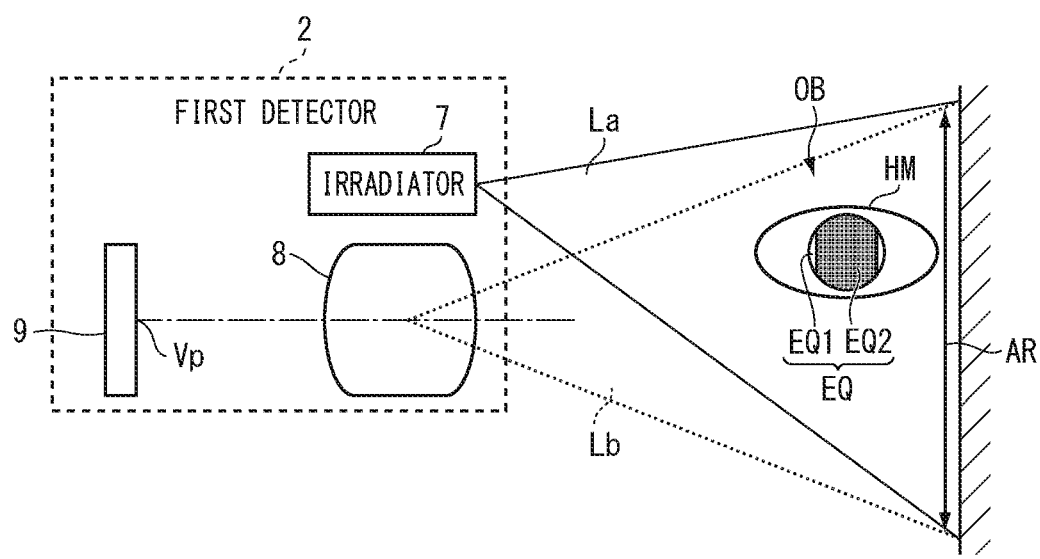
FIG. 2 is a diagram showing a first detector according to the first embodiment.

FIG. 2 is a diagram showing the first detector 2 according to the first embodiment. The first detector 2 executes an active detection (for example, active distance measurement, time of flight type detection) in which a signal (an input signal) is input to the target object OB and a signal (an output signal) output from the target object OB is detected. Examples of the signals mentioned above (the input signal and the output signal) include energy waves selected from lights (such as visible light, invisible light, infrared light, ultraviolet light) and sound waves (such as ultrasonic waves). The first detector 2 in the present embodiment inputs (irradiates) the light La as an input signal to the target object OB, and detects the light Lb as an output signal from the target object OB. The light La and the light Lb are, for example, infrared lights. Thus, the first detector 2 of the present embodiment is an active type sensor.

The first detector 2 includes, for example, a depth sensor (a depth camera). The first detector 2 detects the depth (position information, distance, depth) from the predetermined point to each point on the target object OB. The predetermined point Vp is, for example, a point at a position serving as a reference for detection performed by the first detector 2 (for example, a viewpoint, a point of detection origin, a point at the position of the first detector 2).

The first detector 2 includes an irradiator 7, an optical system 8, and an image-capturing element 9. The irradiator 7 irradiates (for example, projects) the light La (for example, pattern light, irradiation light) to a region AR (a space, or a detection region) which includes the target object OB therein. The optical system 8 includes, for example, an imaging optical system (an image-capturing optical system). The image-capturing element 9 is, for example, a CMOS image sensor or a CCD image sensor. The image-capturing element 9 has a plurality of pixels arranged two-dimensionally. The image-capturing element 9 captures an image of the region AR including the target object OB via the optical system 8. The image-capturing element 9 detects the light Lb (infrared light, return light) which is emitted from the object (the target object OB) in the region AR as a result of irradiation of the light La.

The first detector 2 detects the depth to each pixel of the image-capturing element 9 from a point on the region AR corresponding to each pixel of the image-capturing element 9, on the basis of a pattern of the light La irradiated from the irradiator 7 (for example, an intensity distribution) and a pattern of the light Lb detected by the image-capturing element 9 (an intensity distribution, a captured image). The first detector 2 outputs, as the detection result, a depth map (for example, a depth image, depth information, distance information) representing the distribution of depth in the region AR, to the processing device 3 (see FIG. 1).

The second portion EQ2 of the equipment EQ in the target object OB includes, for example, a portion in the target object OB having a relatively high spatial frequency (for example, a fine structure, a mesh portion). The second portion EQ2 has, for example, a relatively high scattering rate in the target object OB. The second portion EQ2 has, for example, a relatively low reflectance in the target object OB. The second portion EQ2 has, for example, a relatively high absorption rate in the target object OB.

The first detector 2 may be a device which detects a depth by means of a TOF (time of flight) method. The first detector 2 may also be a device which detects a depth by means of a method other than the TOF (time of flight) method. The first detector 2 may also be a device which includes a laser scanner (for example, a laser distance measurer) and detects a depth by means of laser scanning. The first detector 2 may also be a device which includes a phase difference sensor and detects a depth by means of a phase difference method. The first detector 2 may also be a device which detects a depth by means of a DFD (depth from defocus) method.

The first detector 2 may irradiate the target object OB with light other than infrared light (for example, with visible light), and may detect the light emitted from the target object OB (for example, visible light). The first detector 2 may include, for example, a stereo camera or the like, and may detect (for example, may image-capture) the target object OB from a plurality of viewpoints. The first detector 2 may be a device which detects a depth by means of triangulation, using captured images of the target object OB captured from the plurality of viewpoints. The first detector 2 may detect a depth by means of a method other than optical methods (for example, ultrasonic wave scanning).

Returning to the description of FIG. 1, the first detector 2 outputs the detection result of detecting the target object OB to the processing device 3. The processing device 3 includes a first shape information generator 11, a portion specifier 12, a second shape information generator 13, a communicator 14, and a memory storage 15.

The first shape information generator 11 generates first shape information representing the first shape of the target object OB on the basis of the detection result of the first detector 2. For example, the first shape information generator 11 calculates point cloud data as shape information (model information used for three-dimensional modeling, three-dimensional model image original data). In the following description, the process of calculating point cloud data is referred to as point cloud data processing where appropriate. The point cloud data includes three-dimensional coordinates of a plurality of points on the target object OB. The first shape information generator 11 calculates the point cloud data by, for example, perspective-transforming the detection result (depth map) of the first detector 2 into a plane image. The first shape information generator 11 then stores the generated first shape information (for example, the point cloud data) in the memory storage 15.

Figure 3:
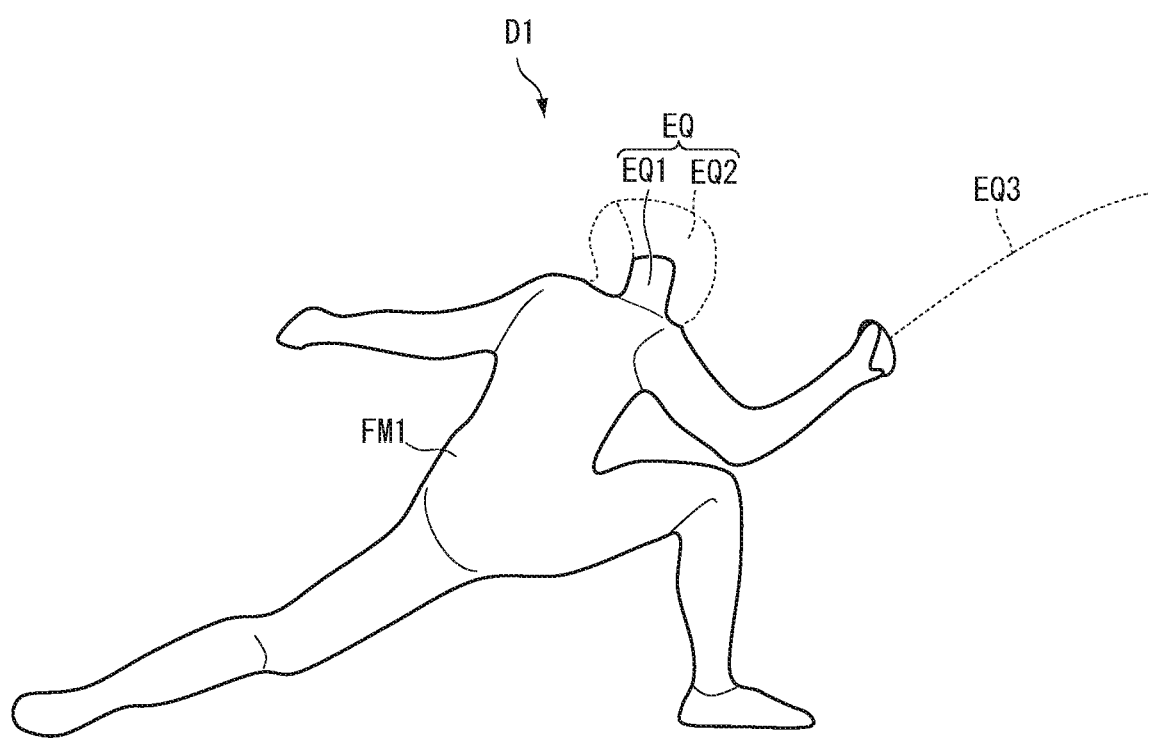
FIG. 3 is a diagram showing first shape information according to the first embodiment.

FIG. 3 is a diagram showing first shape information D1 according to the first embodiment. In FIG. 3, reference sign FM1 denotes the first shape represented by the first shape information. The first shape FM1 represents, for example, a shape in the target object OB in FIG. 1 other than the portion covered by the second portion EQ2 of the equipment EQ (for example, the head of the human body HM). For example, the first shape information generator 11 cannot establish, at a high level of accuracy, the shape of the portion in the target object OB where the accuracy of the detection result by the first detector 2 is below a threshold value, and it becomes the portion in the shape information of the target object OB (the first shape information) generated by the first shape information generator 11 in which at least one of the shapes is missing (shown by the dotted lines in FIG. 3).

The portion in the target object OB corresponding to the first shape FM1 includes, for example, one or both of the portion in the target object OB where the spatial frequency is relatively low and the portion in the target object OB where reflectance of the light is relatively high. The portion in the target object OB where the spatial frequency is relatively low includes, for example, a rough, broad, or a large-sized structure such as an arm, a leg, and a torso. The portion where light reflectance is relatively high and the portion where the spatial the frequency is relatively low are assumed to be portions where, for example, the intensity of the emitted light Lb (see FIG. 1) is high (great) (for example, no less than a threshold value). The portion where the intensity of the emitted light Lb (see FIG. 1) is assumed to be high is, for example, a portion where the accuracy of the detection result by the first detector 2 is assumed to be relatively high.

The reference sign EQ3 denotes a portion corresponding to a sword used in fencing (for example, fleuret, epee, or saber). The portion EQ3 is, for example, a narrow portion in the target object OB where spatial frequency is relatively high, and is a portion having a missing shape in the first shape information D1 (including a portion where a part of the shape is missing).

The first shape FM1 includes a shape obtained by selecting a depth of relatively low accuracy in the detection result of the first detector 2. For example, it is assumed that the second portion EQ2 of the equipment EQ of the target object OB includes a mesh portion, and the intensity of the light Lb emitted from the second portion EQ2 is less than the threshold value. In the second portion EQ2 and the portion covered by the second portion EQ2 (for example, the head), for example, the accuracy of the detection result of the first detector 2 is assumed to be relatively low in the target object OB. The portion in the target object OB corresponding to the first shape FM1 includes, for example, the portion in the human body HM (for example, the head) covered by a preliminarily set portion in the equipment EQ (for example, the second portion EQ2 in FIG. 1).

The first shape information generator 11 then stores the generated first shape information (for example, the point cloud data) in the memory storage 15. The portion specifier 12 specifies a portion in the first shape on the basis of the first shape information generated by the first shape information generator 11. The portion specifier 12 generates, for example, positional information of a characteristic portion of the human body HM (for example, a characteristic portion, a characteristic point). The characteristic portion of the human body HM is, for example, a portion which can be distinguished from other portions of the human body HM. The characteristic portion of the human body HM includes, for example, at least one of a distal part of a human body, a joint, and an intermediate part between a distal part and a joint or between two joints.

The portion specifier 12 generates positional information of the above characteristic portion by means of recognition processing (for example, pattern recognition processing, shape recognition processing, skeletal recognition processing) using the first shape information (for example, the point cloud data) generated by the first shape information generator 11. The positional information of the characteristic portion includes, for example, coordinates (for example, three-dimensional coordinates) of the point representing the characteristic portion. The portion specifier 12 calculates the coordinates of the point representing the characteristic portion by means of the recognition processing mentioned above. Then, the portion specifier 12 causes the memory storage 15 to store the information of the specified portion (for example, the coordinates of the point representing the characteristic portion).

The second shape information generator 13 obtains, as shape information (model information used for three-dimensional modeling, three-dimensional model image original data), a second shape FM2 (an additional shape) on the basis of information different from the detection result of the first detector 2. The second shape FM2 is represented, for example, by additional shape information DF stored in the memory storage 15. The second shape information generator 13, for example, reads the additional shape information DF from the memory storage 15, and obtains the additional shape information DF.

The second shape FM2 includes a shape which represents a portion in the target object OB different from the portion corresponding to the first shape FM1 (see FIG. 3). For example, the second shape FM2 includes a shape representing the head of the human body HM or the equipment EQ. For example, the second shape FM2 may be a shape (for example, a spherical shape, a spheroidal shape) which represents the head of the human body HM or the equipment EQ in an uncomplicated manner (a simplified manner). The second shape FM2 may be a shape which schematically or conceptually shows the head of the human body HM or the equipment EQ.

The second shape FM2 is, for example, a shape which alternatively represents the portion in the target object OB where accuracy is assumed to be relatively low in the detection result of the first detector 2 (a complementary shape). Therefore, the second shape FM2 includes the shape which represents the portion in the target object OB corresponding to a depth with relatively low accuracy in the detection result of the first detector 2. The portion in the target object OB corresponding to the second shape FM2 includes, for example, one or both of the portion in the target object OB where the spatial frequency is relatively high (for example, the second portion EQ2 of the equipment EQ) and the portion in the target object OB where reflectance of the light is relatively low.

In the present embodiment, the first detector 2 detects a depth by irradiating infrared light (for example, the light La) onto the target object OB and detecting infrared light (for example, the light Lb) emitted from the target object OB. In the present embodiment, the information different from the detection result of the first detector 2 includes information (for example, depth information) other than the depth which is obtained by irradiating infrared light onto the target object OB and detecting infrared light emitted from the target object OB. For example, the additional shape information DF includes information different from the detection result (for example, measurement result) of the detection (for example, measurement) performed on the target object OB.

The second shape FM2 includes a shape generated by a creator (for example, a user, an operator, a designer) on a computer COM. For example, when generating the second shape FM2, the creator operates an input device to input data to the computer COM. The input device includes, for example, at least one of a keyboard, a mouse, a trackball, and a touchpad. The computer COM processes information input by the operation of the creator by means of an application, and generates data of the second shape FM2 as the additional shape information DF. The application mentioned above includes, for example, at least one of a designing application such as CAD, a drawing application, and a CG generation application. The computer COM outputs the additional shape information DF representing the second shape FM2 to the processing device 3.

The communicator 14 of the processing device 3 can communicate with a device external to the processing device 3. The processing device 3 receives via the communicator 14 (receiver) the additional shape information DF generated in the computer COM. The memory storage 15 of the processing device 3 stores the received additional shape information DF.

The computer COM may be part of the detection device 1 or a device external to the detection device 1. The computer COM may be a cloud computer or the like which is connected to the processing device 3 in a manner which enables communication therebetween via an Internet line or the like. The additional shape information DF generated on the computer COM to represent the second shape may be stored in a database, and the processing device 3 may be communicably connected to the database. The processing device 3 may obtain the additional shape information DF from the database.

The second shape information generator 13 reads the additional shape information DF from the memory storage 15, and obtains the second shape FM2. The second shape information generator 13 adds the second shape to the first shape so as to be at a relative position preliminarily set with respect to a predetermined portion specified by the portion specifier 12 (for example, at a position corresponding to the head of the human body HM, or at a position corresponding to the equipment EQ). The relative position between the predetermined portion and the second shape FM2 is defined in reference position information DP stored in the memory storage 15. The reference position information DP includes, for example, an offset amount with respect to the position of the predetermined portion specified by the portion specifier 12 (hereinafter, referred to as reference position). For example, the reference position is represented by three-dimensional coordinates (a positional vector), and the offset amount is represented by a three-dimensional vector (a displacement vector).

Figure 4A:
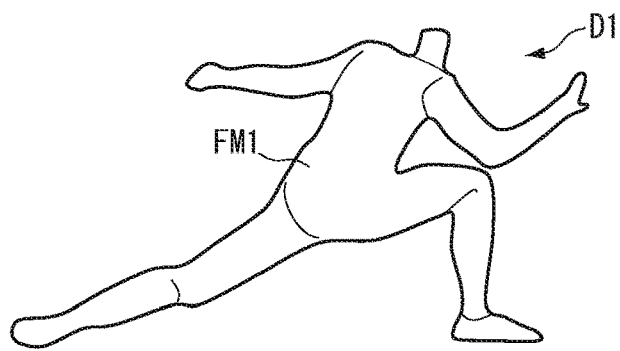
FIG. 4A to FIG. 4D are diagrams showing a process executed by a processing device according to the first embodiment.
Figure 4B:
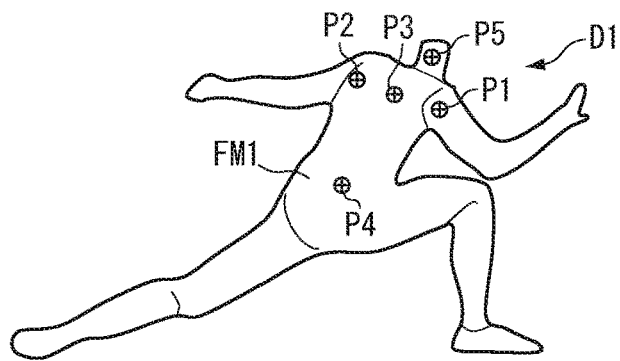

FIG. 4A to FIG. 4D are diagrams showing a process executed by a processing device 3 according to the first embodiment. Appropriate reference will be made to FIG. 1 for each part of the processing device 3. In FIG. 4A, the first shape information generator 11 generates first shape information D1 (for example, point cloud data, skeletal data) which represents the first shape FM1, on the basis of the detection result of the first detector 2 (a first shape generation process). Next, in FIG. 4B, the portion specifier 12 specifies the portion of the first shape FM1 on the basis of the first shape information D1 (a portion specifying process). The portion specifier 12 calculates positions (reference positions) of predetermined portions (for example, right shoulder P1, left shoulder P2, shoulder center P3, waist center P4, and neck P5) which are preliminarily set in the first shape FM1. The portion specifier 12 stores the calculated reference positions in the memory storage 15.

Figure 4C:
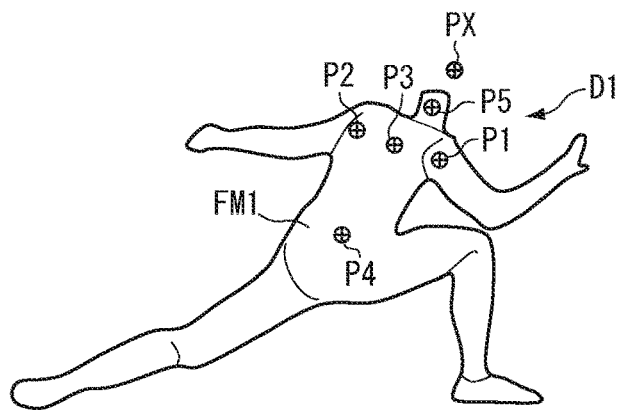

In FIG. 4C, the second shape information generator 13 calculates a position (hereinafter, referred to as target position PX) at which the second shape FM2 (shown in FIG. 4D) is to be arranged (an arranging process). The second shape information generator 13 reads, for example, the reference position and the reference position information DP from the memory storage 15, and calculates, on the basis of these pieces of information, the target position at which the second shape FM2 is to be arranged. For example, the second shape information generator 13 combines the reference position (the positional vector of the predetermined portion) and the offset amount (the displacement vector) included in the reference position information DP to calculate a vector (a positional vector) which represents the target position.

Figure 4D:
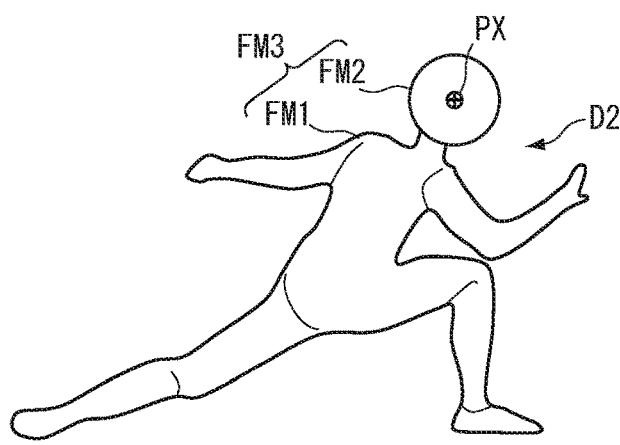

In FIG. 4D, the second shape information generator 13 reads the additional shape information DF from the memory storage 15, and shows the second shape FM2 represented by the additional shape information DF in data of the same format as that of the first shape FM1. For example, the first shape FM1 is represented by point cloud data (first point cloud data) generated on the basis of a detection result (for example, depth) of the first detector 2, and the second shape information generator 13 shows the second shape FM2 by means of point cloud data (second point cloud data) which include the coordinates of each point on the surface of the second shape FM2.

The second shape information generator takes the target position calculated in the arranging process (see FIG. 4C) as a reference (for example, the point of origin), and arranges the second shape FM2 so as to be at the relative position preliminarily set with respect to the first shape FM1, by arranging each point on the surface of the second shape FM2. The preliminarily set relative position mentioned above is defined, for example, in the reference position information DP stored in the memory storage 15. A position serving as a reference in the second shape FM2 (for example, the center), for example, is also preliminarily defined in the additional shape information DF, and the second shape information generator 13 arranges each point on the surface of the second shape FM2 so that the target position and the reference of the second shape FM2 match with each other.

The second shape information generator 13 combines the shape information representing the first shape FM1 (the first point cloud data) and the shape information representing the second shape FM2 arranged with respect to the first shape FM1, and thereby, generates second shape information D2 which represents a shape including the first shape FM1 and the second shape FM2 (combined shape FM3) (an adding process). The second shape information generator 13 causes the memory storage 15 to store the generated second shape information D2 therein.

The second shape information generator 13 may execute the adding process so as to reduce the overlapping portion between the first shape FM1 and the second shape FM2, when executing the adding process. For example, whether or not a part of the first shape FM1 is present within the second shape FM2 may be determined, and at least a part of the portion in the first shape FM2 present within the second shape FM2 (the portion overlapping with the second shape FM2, the overlapping portion) may be removed. The second shape information generator 13 may, when executing the adding process, determine whether or not a part of the first shape FM1 is present in a region distanced from the surface of the second shape FM2 by no more than a predetermined distance (in a vicinity portion), and at least a part of the portion in the first shape FM1 present in the vicinity region of the second shape FM2 (the vicinity portion) may be removed.

After having combined the first shape FM1 and the second shape FM2, the second shape information generator 13 may remove one or both of at least a part of the overlapping portion and at least a part of the vicinity portion, to generate the second shape information. Before combining the first shape FM1 and the second shape FM2, the second shape information generator 13 may remove one or both of at least a part of the overlapping portion and at least a part of the vicinity portion, and may arrange the second shape FM2 with respect to the first shape FM1 in which a part thereof has been removed therefrom, to generate the second shape information.

The portion specifier 12 may specify the first portion EQ1 of the equipment EQ in the first shape FM1 (see FIG. 2). For example, the shape of the first portion EQ1 is known in advance, and the memory storage 15 may preliminarily store the shape information which indicates the shape of the first portion EQ1. The portion specifier 12 may specify the first portion EQ1 of the first shape FM1 on the basis of the shape information of the first portion stored in the memory storage 15. The second shape information generator 13 may arrange the second shape FM2 at a position preliminarily set with respect to the position of the first portion EQ1 of the equipment EQ specified by the portion specifier 12 in the first shape FM1, to combine the first shape FM1 and the second shape FM2.

The second shape information generator 13 may add a shape representing a fencing sword (see the portion EQ3 in FIG. 2) as the second shape FM2 to the first shape FM1. For example, when adding the shape of an equipment having a large deformation amount such as a fencing sword, a mark may be made on the equipment, for example, and a result of detecting the mark may be used to estimate the shape of the equipment (for example, the fencing sword). The second shape information generator 13 may add the estimated shape as the second shape FM2 to the first shape FM1.

The first shape information generator 11 may generate surface information as shape information. The surface information is, for example, polygon data, vector data, draw data, or the like. The surface information includes, for example, coordinates of a plurality of points and linkage information between the plurality of points. The linkage information includes, for example, information which mutually associates points at both ends of a line corresponding to a ridge line (an edge) of an object (for example, a human body). The linkage information includes, for example, information which mutually associates a plurality of lines corresponding to outlines of a plane on the object.

For example, the first shape information generator 11 may estimate a plane between a point selected from the plurality of points included in the point cloud data and a point in the vicinity thereof, and may convert the point cloud data into polygon data having inter-point plane information. The first shape information generator 11 converts the point cloud data into polygon data by means of an algorithm using a least squares method, for example. This algorithm may be one to which an algorithm published in the point cloud processing library is applied, for example. The second shape information generator 13 may generate surface information as shape information.

The second shape information generator 13 may adjust the relative size between the first shape FM1 and the second shape FM2 to combine the first shape FM1 and the second shape FM2. For example, the second shape information generator 13 may adjust the size of the second shape FM2 on the basis of the first shape FM1. The ratio of the size of the second shape FM2 to the first shape FM1 may be defined in the additional shape information DF. The second shape information generator 13 may determine (for example, may calculate) the size of the second shape FM2 by multiplying the size of the first shape FM1 on the basis of the detection result of the first detector 2 by the above ratio defined in the additional shape information DF.

The timing at which the processing device 3 obtains the additional shape information DF is set to an arbitrary timing before the second shape information generator 13 generates the second shape information. For example, the processing device 3 may preliminarily obtain the additional shape information DF before the first detector 2 starts the detection process. The processing device 3 may obtain the additional shape information DF in parallel with the detection process performed by the first detector 2. The processing device 3 may obtain the additional shape information DF after the first detector 2 finishes the detection process.

Figure 5:
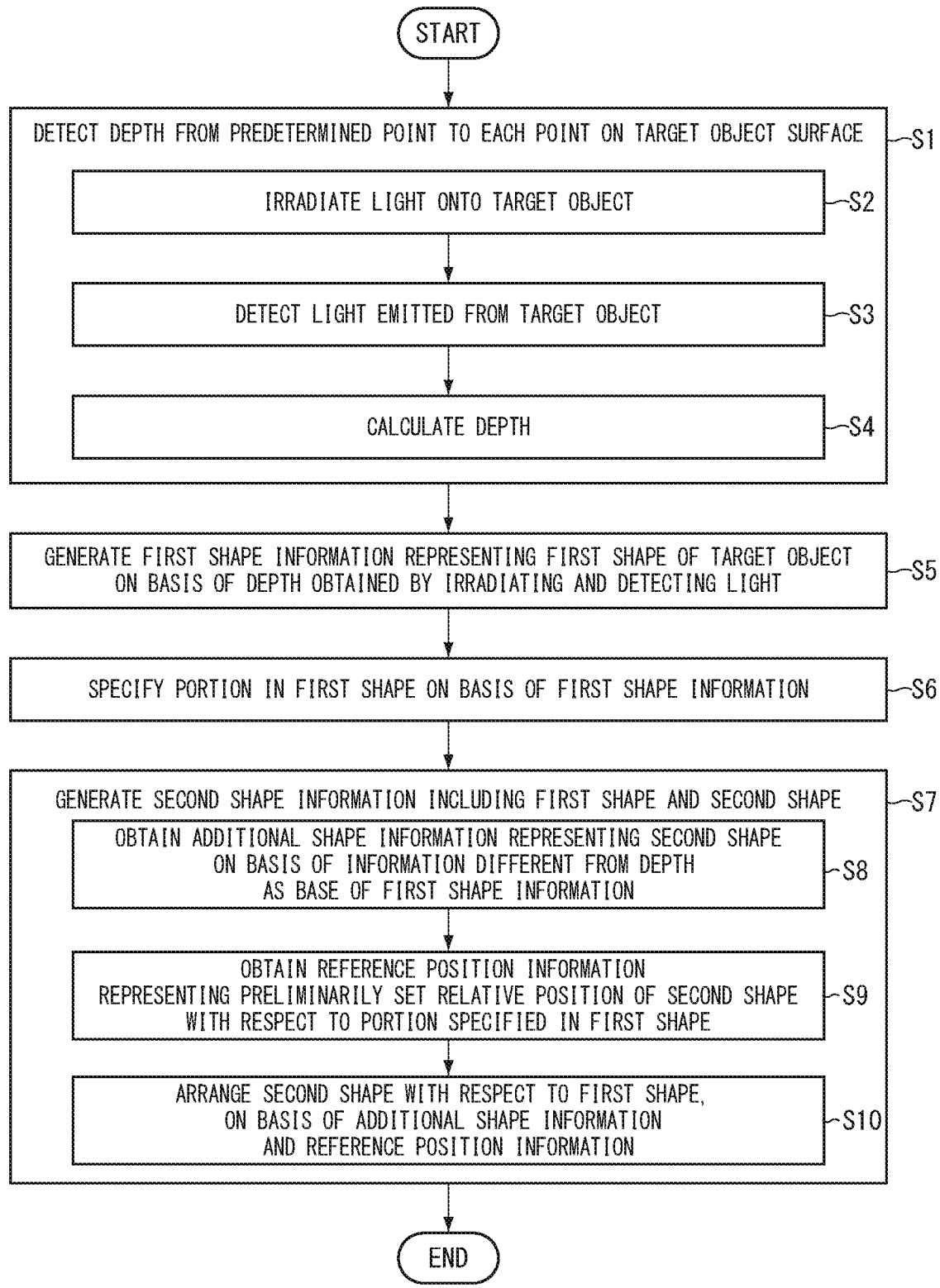
FIG. 5 is a flowchart showing a detection method according to the embodiment.

Next, a detection method according to the embodiment is described on the basis of operations of the detection device 1 described above. FIG. 5 is a flowchart showing the detection method according to the embodiment. Appropriate reference will be made to FIG. 1 to FIG. 4D for each part and each process of the detection device 1. In Step S1, the first detector 2 (see FIG. 1) detects the depth from the predetermined point Vp to each point on the surface of the target object OB. In Step S2 of Step S1, the irradiator 7 (see FIG. 2) irradiates the target object OB with the light La. In Step S3, the image-capturing element 9 detects the light Lb emitted from the target object OB. In Step S4, the first detector 2 calculates the depth on the basis of the detection result of the image-capturing element 9.

Next, in Step S5, the first shape information generator 11 of the processing device 3 (see FIG. 1) generates the first shape information representing the first shape FM1 of the target object OB (see FIG. 4A) on the basis of the depth obtained as a result of irradiating and detecting the light (the detection result of Step S1). The memory storage 15 stores the first shape information generated by the first shape information generator 11. In Step S6, the portion specifier 12 specifies the portion in the first shape FM1 (see FIG. 4B) on the basis of the first shape information generated in Step S5. The memory storage 15 stores information on the portion specified by the portion specifier 12 (for example, the position of the predetermined portion).

Next, in Step S7, the second shape information generator 13 of the processing device 3 (see FIG. 1) generates the second shape information D2 representing the shape (the combined shape FM3) which includes the first shape FM1 and the second shape FM2 (see FIG. 4D). In Step S8 of Step S7, the second shape information generator 13 obtains the additional shape information DF representing the second shape FM2, which is based on information different from the depth serving as the base of the first shape information. The additional shape information DF is preliminarily stored in the memory storage 15 before the processing of Step S8 starts, for example. The second shape information generator 13 reads the additional shape information DF from the memory storage 15, and obtains the additional shape information DF.

In Step S9 of Step S7, the second shape information generator 13 obtains the reference position information DP which indicates the preliminarily set relative position between the portion specified in the first shape FM1 and the second shape. The reference position information DP is preliminarily stored in the memory storage 15 before the processing of Step S9 starts, for example. The second shape information generator 13 reads the reference position information DP from the memory storage 15, and obtains the reference position information DP.

In Step S10, the second shape information generator 13 arranges the second shape FM2 with respect to the first shape FM1 on the basis of the additional shape information DF and the reference position information DP. The second shape information generator 13 adds the second shape FM2 to the first shape FM1 by representing the second shape FM2 in the same coordinate system as that of the first shape FM1, so that the reference position of the three-dimensional shape (the second shape FM2) defined in the additional shape information DF and the position of the predetermined portion specified from the first shape FM1 are positioned relative to each other as preliminarily set. As described above, the second shape information generator 13 generates the second shape information D2 representing the combined shape DF3 which includes the first shape FM1 and the second shape FM2.

Second Embodiment

Figure 6:
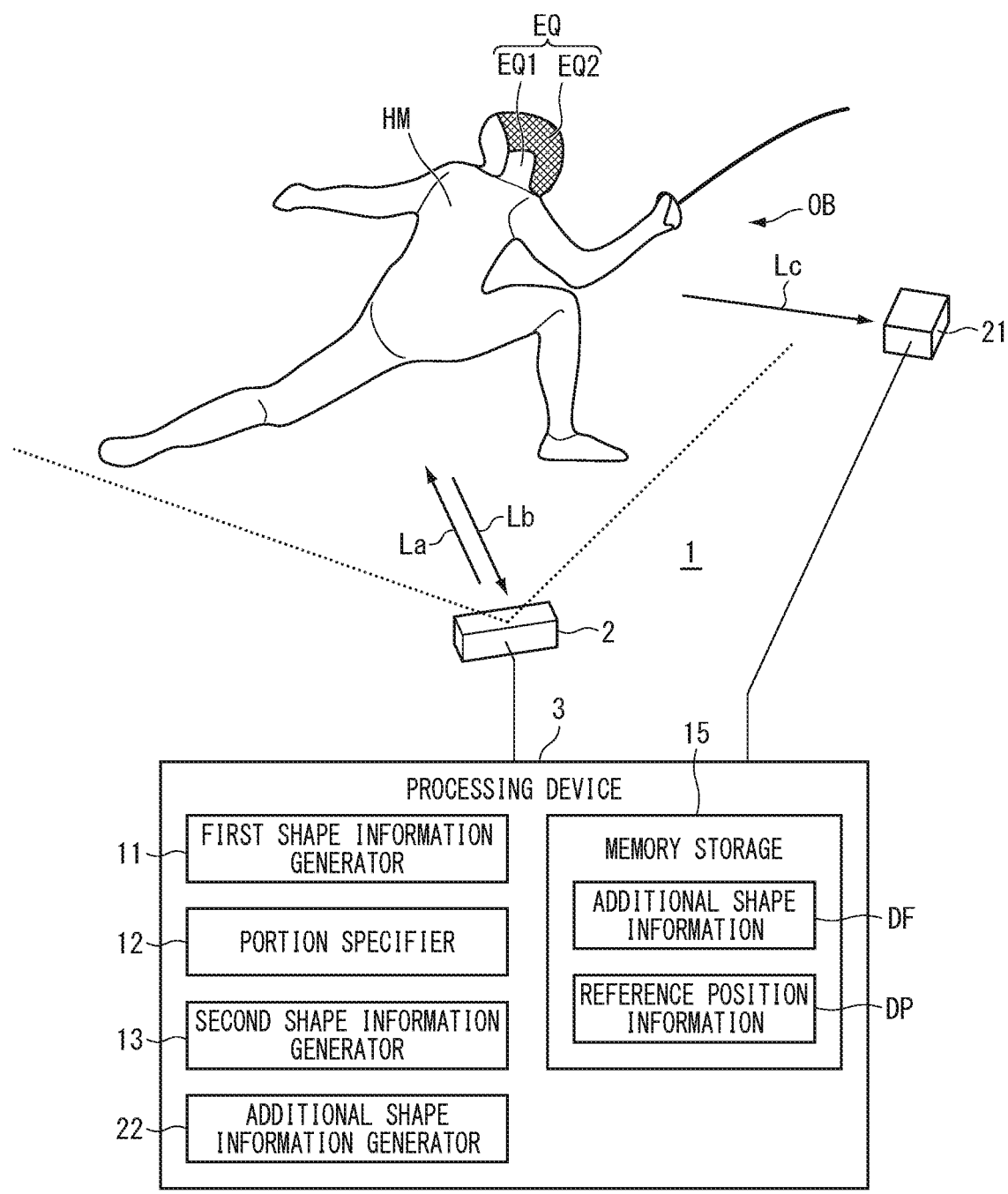
FIG. 6 is a diagram showing a detection device according to a second embodiment.

Next, a second embodiment will be described. In the present embodiment, the same reference signs are given to the same configurations as those in the embodiment described above, and the descriptions thereof will be omitted or simplified. FIG. 6 is a diagram showing a detection device 1 according to the second embodiment. The detection device 1 according to the present embodiment detects a target object OB and obtains additional shape information DF, for example. The detection condition for detecting at the time of obtaining additional shape information DF differs from the detection condition of the first detector 2 at the time of obtaining the information representing the first shape FM1. The detection device 1 executes a detection under a different detection condition from that of the first detector 2 so as to increase the accuracy for the portion where the accuracy is relatively low in the detection result of the first detector 2.

The detector 1 according to the present embodiment includes a second detector 21. The first detector 2 detects the target object OB under a first detection condition, and the second detector 21 detects the target object OB under a second detection condition, which is different from the first detection condition. The information different from the detection result of the first detector 2 includes information obtained by executing a detection under the second detection condition, which differs from the first detection condition. For example, the information different from the detection result of the first detection unit 2 (first detection result) includes the detection result of the second detector 21 (second detection result). The second detection condition differs from the first detection condition in the spatial resolution of detection. For example, a detection under the second detection condition has a higher spatial resolution compared with a detection under the first detection condition.

The second detection condition differs from the first detection condition, for example, in the detection method for detecting the target object OB. The second detector 21 includes, for example, a stereo camera, and detects light Lc emitted from the target object OB from a plurality of viewpoints. The second detector 21 detects the depth from the second detector 21 to each point on the surface of the target object OB by means of triangulation using a plurality of captured images including the captured image at each of the plurality of viewpoints.

In the second detection condition, the wavelength of detection target light may be different from that of the first detection condition. For example, the light Lc detected by the second detector 21 may have a wavelength different from that of the light Lb detected by the first detector 2. For example, the light Lb detected by the first detector 2 may include infrared light, and the light Lc detected by the second detector 21 may include visible light. For example, the second detector 21 may include a sensor (for example, an image-capturing element, a light receiving element) which detects the surface of the target object OB with visible light emitted from the target object OB. The second detector 21 may obtain a captured image of the target object OB (for example, a color image, an RGB image) from each of the plurality of viewpoints. The captured image obtained by detecting visible light can be easily obtained at a higher resolution than, for example, a depth image. For example, the second detector 21 can detect a fine structure in the target object OB compared to the first detector 2, and thus can obtain a depth related to the fine structure at a high level of accuracy (highly accurately).

The second detection condition may differ from the first detection condition in illumination condition. For example, the first detector 2 may execute an active distance measurement (active detection), and the second detector 21 may execute a passive distance measurement (passive detection). For example, the second detector 21 may obtain the depth from the second detector 21 to each point on the surface of the target object OB by performing an optical detection using outdoor daylight or ambient light for illumination (for example, image capturing using an image-capturing element such as a CCD) without irradiating the illumination light (for example, visible light) onto the target object OB.

The second detection condition may differ from the first detection condition in the relative position of detection origin where detection of the target object OB is executed with respect to the detection target object OB. For example, the distance (relative position) between the second detector 21 (detection origin) and the target object OB may differ from the distance (relative position) between the first detector 2 (detection origin) and the target object OB. For example, in the case where the distance between the second detector 21 and the target object OB is shorter than the distance between the first detector 2 and the target object OB, the second detector 21 can easily obtain the depth related to the fine structure in the target object OB at a high level of accuracy (highly accurately).

For example, the orientation (relative position) of the second detector 21 (detection origin) with respect to the target object OB may differ from the orientation (relative position) of the first detector 2 (detection origin) with respect to the target object OB. For example, the second detector 21 may detect, at a higher level of accuracy (highly accurately), the depth related to the second portion EQ2 of the equipment EQ compared with the first detector 2, on the basis of the angle being different from that of the first detector 2, between the line connecting the illumination and the target object OB and the line connecting the target object OB and the detection origin (for example, the relative position between three points, i.e., the illumination, the target object, and the detection origin).

The second detector 21 outputs the detection result of detecting the target object OB (second detection result) to the processing device 3. The detection result of the second detector 21 includes, for example, the depth detected under the detection condition different from that of the first detector 2. In the present embodiment, the processing device 3 includes an additional shape information generator 22. The additional shape information generator 22 generates additional shape information DF on the basis of the detection result of the second detector 21.

The additional shape information generator 22 generates, as the additional shape information DF, shape information of the object (for example, the second portion EQ2 of the equipment EQ) in a predetermined region which serves as a relative position preliminarily determined with respect to the position of the portion specified by the portion specifier 12 (for example, the first portion EQ1 of the equipment EQ). The predetermined region is, for example, a spatial region of a predetermined size around the reference position which is obtained from the position of the portion specified by the portion specifier 12 and the relative position defined in the reference position information DP.

The additional shape information generator 22, for example, processes the depth obtained from the second detector 21 by means of the same algorithm as that of the first shape information generator 11, and generates the additional shape information DF representing the shape of the second portion EQ2 of the equipment EQ. The additional shape information generator 22 causes the memory storage 15 to store the generated additional shape information DF therein. As with the first embodiment, the second shape information generator 13 combines the first shape FM1 and the second shape FM2 as shown in FIG. 4D on the basis of the additional shape information DF and the reference position information DP, and generates shape information (second shape information D2) representing a shape (a combined shape DF3) which includes the first shape FM1 and the second shape FM2.

Third Embodiment

Figure 7:
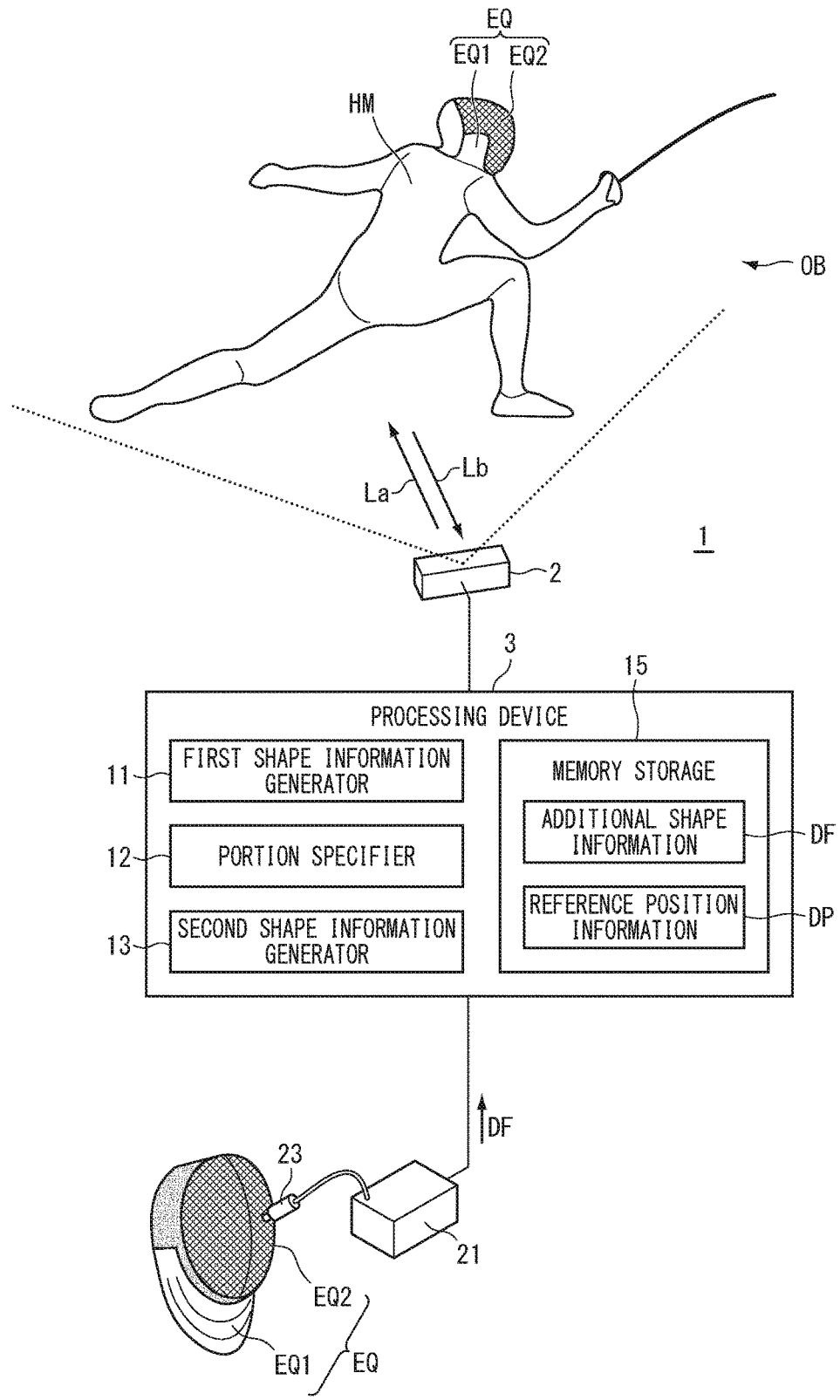
FIG. 7 is a diagram showing a detection device according to a third embodiment.

Next, a third embodiment will be described. In the present embodiment, the same reference signs are given to the same configurations as those in the embodiment described above, and the descriptions thereof will be omitted or simplified. FIG. 7 is a diagram showing a detection device according to a third embodiment. The detection device 1 according to the present embodiment detects a target object OB and obtains additional shape information DF, for example. In the present embodiment, the second detector 21 detects the target object OB under a detection condition (by means of a detection method) different from that in the second embodiment. The second detector 21 in the present embodiment comes in contact with the equipment EQ of the target object OB to detect the shape of the equipment EQ.

The second detector 21 according to the present embodiment includes a sensor 23 (for example, a contact-type sensor or a non-contact-type sensor using a probe or the like) which comes in contact with the target object OB and detects the surface of the target object OB. The second detector 21 detects the target object OB before the first detector 2 starts or after it finishes the process of detecting the target object OB, for example. The second detector 21 scans the surface of the equipment EQ (the first portion EQ1) by means of the sensor 23, and obtains the position (for example, three-dimensional coordinates) of each point on the surface of the equipment EQ. The second detector 21 outputs, for example, shape information (for example, point cloud data) representing the shape of the equipment EQ as the detection result (second detection result), to the processing device 3. The memory storage 15 of the processing device 3 stores the shape information output from the second detector 21 as additional shape information DF. In the embodiment described above, the second detector 21 may be a device external to the detection device 1. The second detector 21 may scan at least one of the surface of the first portion EQ1 and the surface of the second portion EQ2 (for example, the surface of the second portion EQ2) by means of the sensor 23, to detect the position of each point on the surface. The second detector 21 in the present embodiment may use a non-contact-type sensor for the equipment EQ to detect the shape of the equipment EQ.

Fourth Embodiment

Figure 8:
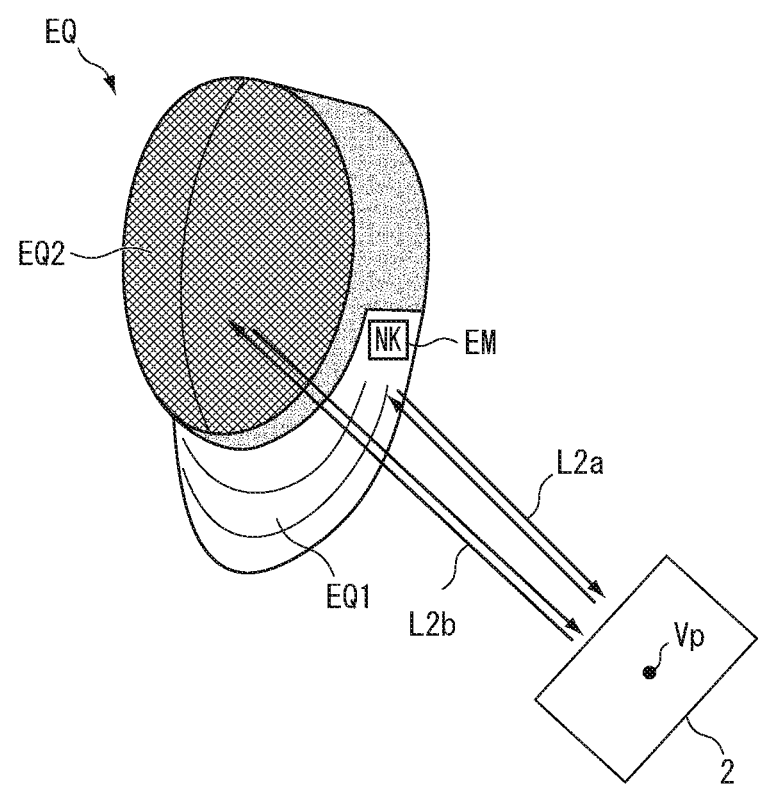
FIG. 8 is a diagram showing an equipment according to a fourth embodiment.

Next, a fourth embodiment will be described. In the present embodiment, the same reference signs are given to the same configurations as those in the embodiment described above, and the descriptions thereof will be omitted or simplified. FIG. 8 is a diagram showing an equipment according to the fourth embodiment. The equipment EQ is attached, for example, to the human body HM (the head in this case) as shown in FIG. 1 and is used at the time of detecting the target object OB including the human body HM and the equipment EQ. The equipment EQ in FIG. 8 is, for example, a fencing mask. The equipment EQ is attached to an object (for example, the human body HM in FIG. 1) arranged with respect to the first detector 2 which detects a depth by detecting light traveling toward a predetermined point Vp.

The equipment EQ, on the surface thereof, includes a first portion EQ1, a second portion EQ2, and an identifier EM. The first portion EQ1 reflects at least a part of light L2a irradiated from the predetermined point Vp and emits it toward the predetermined point Vp. The first portion EQ1 is a portion which covers the neck, and has a relatively low spatial frequency (has a rough structure) in the equipment EQ. For the first portion EQ1, the material, the color, and so forth are selected so that the intensity of the light L2a emitted from the first portion EQ1 is no less than a threshold value when irradiating the light L2a, for example. The identifier EM is provided at a predetermined position on the first portion EQ1. The material, the color, the shape, and so forth of the identifier EM (for example, a mark) are selected so that the reflectance thereof is high and the accuracy of detection result is higher than that in the portion in the first portion EQ1 different from the identifier EM when optically detecting the equipment EQ.

The second portion EQ2 is arranged at a predetermined relative position with respect to (in a known positional relationship with) the first portion EQ1. In the second portion EQ2, the intensity of the light (for example, reflected light) emitted toward the predetermined point Vp among light L2b irradiated from the predetermined point Vp is weaker than that in the first portion EQ1. For example, the second portion EQ2 includes a mesh portion mentioned above, and has a relatively high spatial frequency (has a fine structure) in the equipment EQ. In the second portion EQ2, for example, the scattering rate is higher than that in the first portion EQ1, so that the intensity of the light L2b emitted toward the predetermined point Vp is weak. In the second portion EQ2, the absorption rate is higher than that in the first portion EQ1, so that the intensity of the light L2b emitted toward the predetermined point Vp may be weak. The intensity of the light L2b emitted from the second portion EQ2 toward the predetermined point Vp may be zero (the light L2b need not be emitted from the second portion EQ2).

For example, when the equipment EQ according to the present embodiment is detected by the first detector 2, the first portion EQ1 can be easily and highly accurately estimated and specified by the identifier EM. Since the second portion EQ2 is arranged at the predetermined relative position with respect to the first portion EQ1, the position of the second portion EQ2 can be easily and accurately estimated and specified by specifying the position of the first portion EQ1, for example.

Fifth Embodiment

Figure 9:
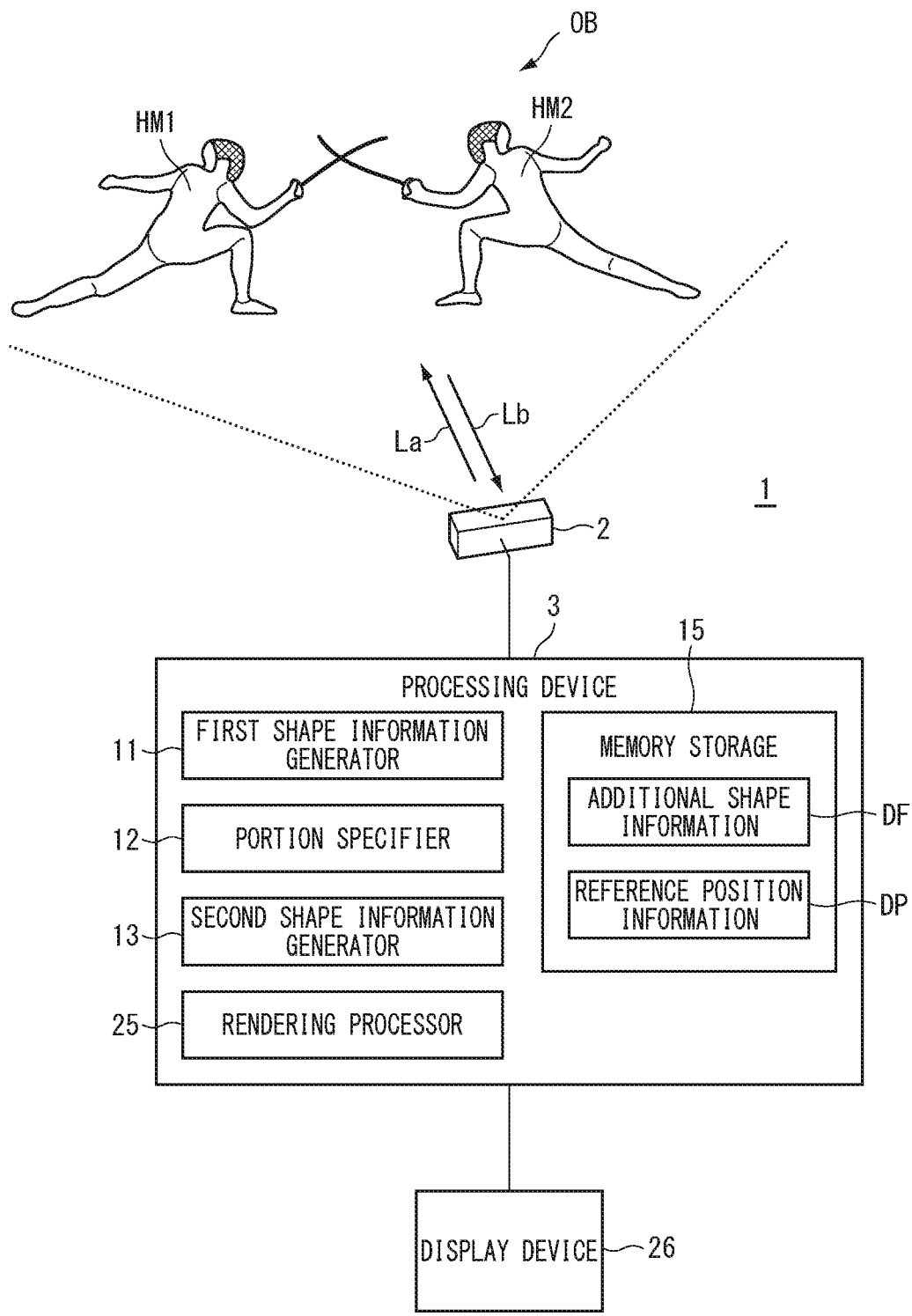
FIG. 9 is a diagram showing a detection device according to a fifth embodiment.

Next, a fifth embodiment will be described. In the present embodiment, the same reference signs are given to the same configurations as those in the embodiment described above, and the descriptions thereof will be omitted or simplified. FIG. 9 is a diagram showing a detection device according to the fifth embodiment. In the present embodiment, the processing device 3 estimates information on viewpoint of a human body HM1, for example. In FIG. 9, the target object OB includes a human body HM1 and a human body HM2, and information on the viewpoint of the human body HM1 is used for estimating an image of the human body HM2 viewed from the viewpoint of the human body HM1, for example. Hereunder, processing of the processing device 3 according to the present embodiment will be described. Appropriate reference will be made to FIG. 9 for each part of the detection device 1.

Figure 10:
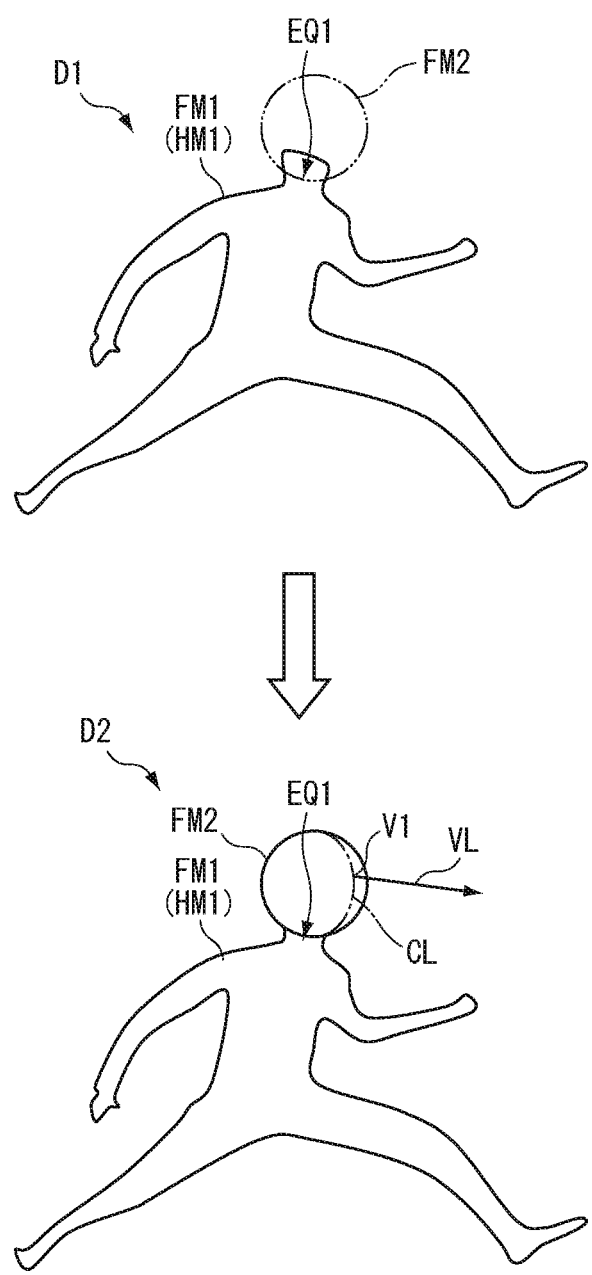
FIG. 10 is a diagram showing a process executed by a processing device according to the fifth embodiment.

FIG. 10 is a diagram showing a process executed by the processing device 3 according to the fifth embodiment. The second shape information generator 13 (see FIG. 9) of the processing device 3 estimates the orientation (or the angle) of a portion in the target object OB (for example, the head of the human body HM1, the equipment EQ) corresponding to the second shape FM2, on the basis of the first shape FM1. For example, the second shape information generator 13 estimates the shape of the surface of a portion which is preliminarily set as a portion continuing from the second shape FM2 (for example, the neck of the human body HM1, the shoulder of the human body HM1, or the first portion EQ1 of the equipment EQ). For example, the second shape information generator 13 derives a normal direction distribution at each point on the surface of the preliminarily set portion, using the first shape information generated by the first shape information generator 11, and detects (estimates) a surface torsion (for example, a neck torsion angle, a shoulder torsion angle) on the basis of that distribution. The second shape information generator 13 sets the orientation (or angle) of the second shape FM2 with respect to the first shape FM1 on the basis of the detected torsion. As described above, for example, when in motion, orientations (directions) of the chest and the neck (or the head) of the human body HM1 may each be different with respect to the human body HM2 in some cases. Therefore, the second shape information generator 13 determines the orientation of the second shape FM2 with respect to the first shape FM1 depending on the orientation of the neck (or the head), and sets the position of the second shape FM2 with respect to the first shape FM1 (the direction of the neck, or the sight line of the head) on the basis of the determined orientation.

In the present embodiment, the additional shape information DF (see FIG. 9) includes viewpoint information preliminarily set in the second shape FM2. As shown in FIG. 10, the viewpoint information includes, for example, the position of a viewpoint V1 in the second shape FM2 and the orientation of a sight line VL starting from the viewpoint V1. The position of the viewpoint V1 of the second shape FM2 is represented, for example, by coordinates (for example, a three-dimensional positional vector) in a coordinate system which defines the second shape FM2. For example, when the second shape FM2 is the head of the human body HM1, the position of the viewpoint V1 is set (defined) at the center of both eyes (on the center line CL of the face). The position of the viewpoint of the left eye and the position of the viewpoint of the right eye may each be set for the position of the viewpoint V1. The orientation of the sight line VL is set, for example, to the normal direction at the viewpoint V1 on the surface of the second shape FM2. The orientation of the sight line VL is represented, for example, as a three-dimensional directional vector in the coordinate system which defines the second shape FM2.

The second shape information generator 13 generates (calculates) the position of the viewpoint V1 where the second shape FM2 is arranged with respect to the first shape FM1, for example, by coordinate-transforming the positional vector representing the position of the viewpoint V1 into the positional vector on the coordinate system representing the first shape FM1. The second shape information generator 13 generates (calculates) the orientation of the sight line where the second shape FM2 is arranged with respect to the first shape FM1, for example, by coordinate-transforming the directional vector representing the orientation of the viewpoint V1 into the directional vector on the coordinate system representing the first shape FM1.

Returning to the description of FIG. 9, the detection device 1 according to the present embodiment includes a rendering processor 25 and a display device 26. The rendering processor 25 includes, for example, a graphics processing unit (GPU). The rendering processor 25 may be configured in a manner such that a CPU and a memory execute each processing according to an image processing program. The rendering processor 25 performs, for example, at least one of rendering processing, texture mapping processing, and shading processing.

In the rendering processing, for example, the rendering processor 25 can calculate an estimated image (a reconstructed image) of a shape defined in the shape information viewed from an arbitrary viewpoint (for example, a viewpoint of viewing the human body HM1 and the human body HM2 from the first detector 2, a viewpoint of viewing the human body HM2 from the human body HM1, or a viewpoint of viewing the human body HM1 from the human body HM2). In the following description, a shape indicated by shape information is referred to as model shape. The rendering processor 25 can reconstruct a model shape (for example, an estimated image) from shape information by means of the rendering processing for example. The rendering processor 25 causes the memory storage 15 to store, for example, the data of the calculated estimated image therein. In the texture mapping processing, the rendering processor 25 can calculate an estimated image in which a texture is applied onto the surface of an object (for example, a human body HM1, a human body HM2) in the estimated image. The rendering processor 25 can calculate an estimated image in which a texture different from that of the target object OB is applied onto the surface of an object (for example, a human body HM1, a human body HM2) in the estimated image. In the shading processing, the rendering processor 25 can calculate, for example, an estimated image in which shading formed by an arbitrary light source is applied onto the surface of an object (for example, a human body HM1, a human body HM2) in the estimated image.

The display device 26 displays this image on the basis of data of an image output from the processing device 3. For example, the processing device 3 outputs data of an estimated image generated by the rendering processor 25 to the display device 26. The display device 26 displays the estimated image on the basis of the data of the estimated image output from the processing device 3. The display device 26 may be, for example, a liquid crystal display, a touch panel, or the like.

Figure 11A:
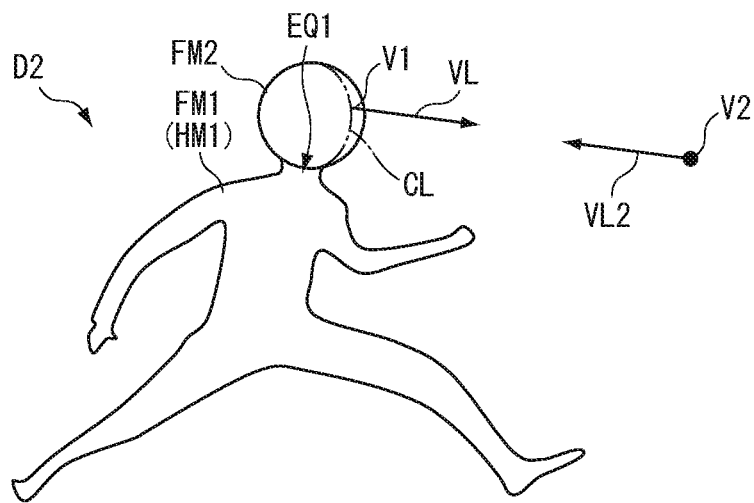
FIG. 11A to FIG. 11C are diagrams showing a process executed by the processing device according to the fifth embodiment.
Figure 11B:
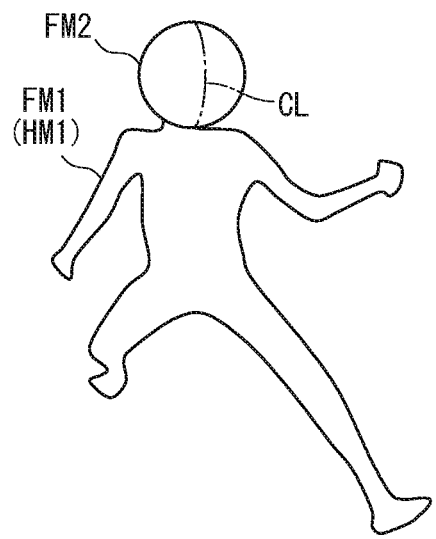
Figure 11C:
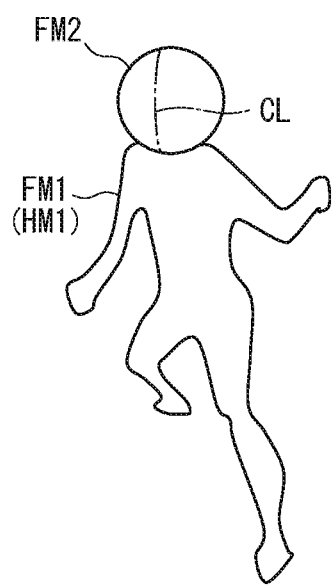

FIG. 11A to FIG. 11C are diagrams showing a process executed by the processing device 3 according to the fifth embodiment. The second shape information generator 13 (see FIG. 9) generates information on the viewpoint of the human body HM2 by means of the same processing as that in FIG. 10. In FIG. 11A, reference sign V2 denotes a viewpoint of the human body HM2 estimated by the second shape information generator 13. Reference sign VL2 denotes a viewpoint of the human body HM2 estimated by the second shape information generator 13.

The rendering processor 25 estimates an image viewed from the viewpoint V2 of the human body HM2, on the basis of the shape information of the human body HM1 generated by the second shape information generator 13 and positional information (the position of the viewpoint V2, the orientation of the sight line VL2) of the viewpoint V2 of the human body HM2. FIG. 11B is a diagram showing an image (estimated image) of the human body HM1 viewed from the viewpoint V2 in FIG. 11A. FIG. 11C is a diagram showing an estimated image in the case where the position of the viewpoint V2 and the orientation of the sight line VL2 have changed from the state shown in FIG. 11A. In FIG. 11C, the appearance of the human body HM1 has changed from the state shown in FIG. 11B on the basis of the viewpoint V2 and the sight line VL2 of the human body HM2.

In the detection device 1 according to the present embodiment, for example, the first detector 2 detects the human body HM1 and the human body HM2 in real time. The second shape information generator 13 estimates, for example, positional information of the viewpoint of the human body HM2 at each time. The rendering processor 25 can updates the image of the human body HM1 viewed from the viewpoint of the human body HM2 in real time, using, for example, the positional information of the viewpoint of the human body HM2 estimated by the second shape information generator 13 and the shape information related to the human body HM1 generated by the second shape information generator 13. Such a detection device 1 can display the estimated image generated on the display device 26 in real time, and can provide a realistic image.

The number of human bodies included in the target object OB is two in FIG. 9, however, may also be one, or three or more. The rendering processor 25 may be provided in a device different from the processing device 3. The display device 26 may be a device external to the detection device 1.

Sixth Embodiment

Figure 12:
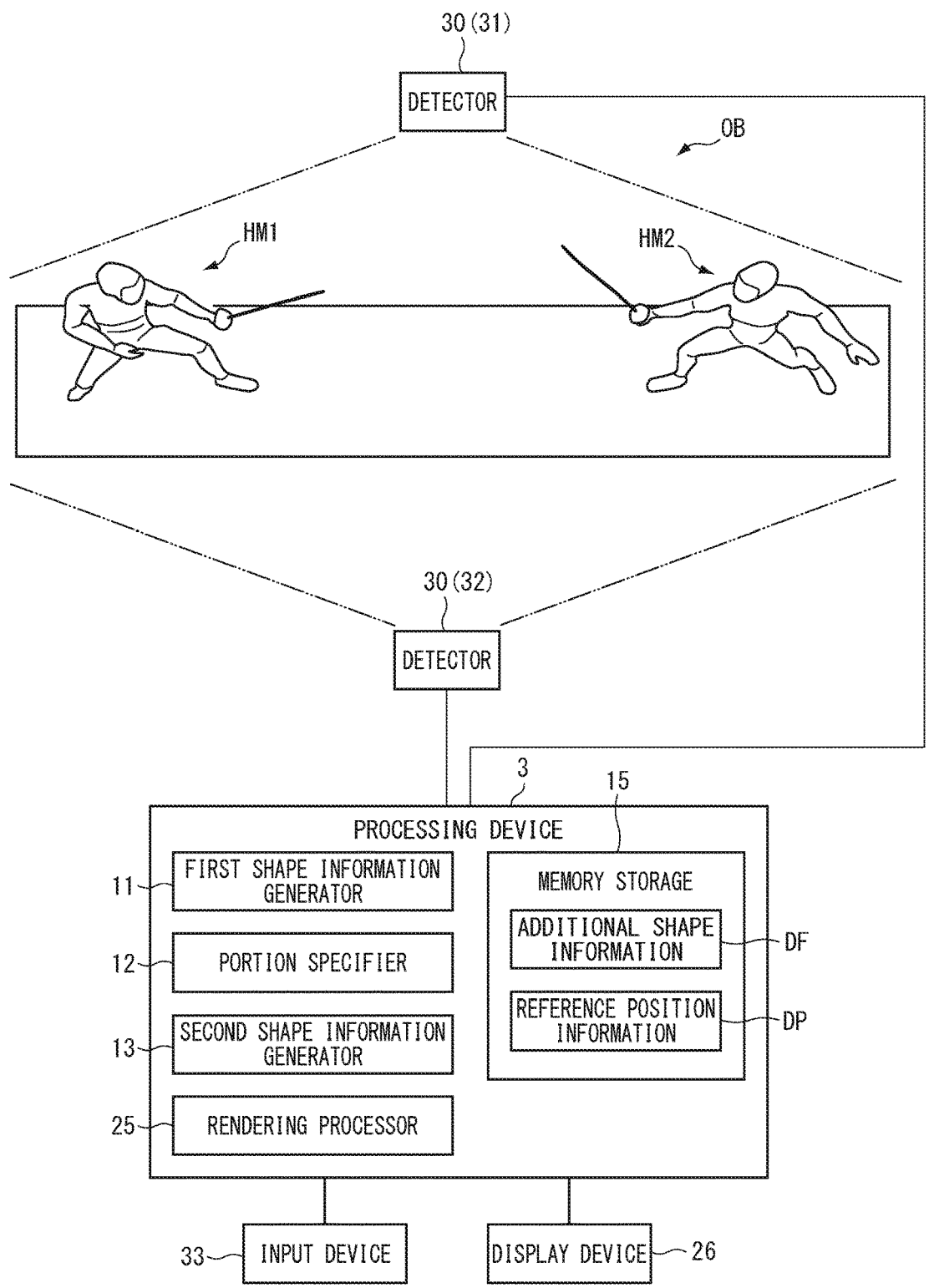
FIG. 12 is a diagram showing a detection device according to a sixth embodiment.

Next, a sixth embodiment will be described. In the present embodiment, the same reference signs are given to the same configurations as those in the embodiment described above, and the descriptions thereof will be omitted or simplified. FIG. 12 is a diagram showing a detection device according to the sixth embodiment. In FIG. 12, the target object OB includes a human body HM1 and a human body HM2. In the following description, the human body HM1 is referred to as first athlete HM1 and the human body HM2 is referred to as second athlete HM2 where appropriate. The detection device 1 generates, for example, one or both of viewpoint information of the first athlete HM1 and viewpoint information of the second athlete HM2. The viewpoint information mentioned above includes at least one of viewpoint position, sight line orientation, and viewing field in the first athlete HM1 or the second athlete HM2. The detection device 1 generates, on the basis of the generated viewpoint information (the viewpoint information of the first athlete HM1 and the viewpoint information of the second athlete HM2), one or both of a first estimated image and a second estimated image, the first estimated image being an estimated image of the second athlete HM2 viewed from the first athlete HM1, and the second estimated image being an estimated image of the first athlete HM1 viewed from the second athlete HM2.

The detection device 1 (detection system) according to the present embodiment includes a plurality of detectors 30 (for example, detector 31, detector 32), the processing device 3, the display device 26, and an input device 33. The plurality of detectors 30 are arranged at positions where the first athlete HM1 and the second athlete HM2 can be detected, and each detect the target object OB from different viewpoints (first viewpoint, second viewpoint). The detection device 1 detects the target object OB from a plurality of viewpoints by means of the plurality of detectors 30. The plurality of detectors 30 include, for example, the first detector 2 shown in FIG. 1 and so forth. For example, one or both of the detector 31 and the detector 32 include the first detector 2. The plurality of detectors 30 may include the second detector 21 shown in FIG. 6. For example, one or both of the detector 31 and the detector 32 may include the second detector 21.

The second shape information generator 13 of the processing device 3 generates second shape information which represents a shape including the first shape FM1 (see FIG. 10) and the second shape FM2, using first shape information related to the first athlete HM1 obtained from detection results of the plurality of detectors 30, for example. When generating the second shape information, the second shape information generator 13 generates viewpoint information related to the first athlete HM1. The second shape information generator 13 causes the memory storage 15 to store therein the generated viewpoint information related to the first athlete HM1. For the second athlete HM2 also, the second shape information generator 13 generates viewpoint information related to the second athlete HM2 in a similar manner. The second shape information generator 13 causes the memory storage 15 to store therein the viewpoint information related to the second athlete HM2.

The rendering processor 25 generates the first estimated image in which an image of the second athlete HM2 viewed from the viewpoint of the first athlete HM1 is estimated (a three-dimensional model image in which the second athlete HM2 is 3D-modeled), using the viewpoint information of the first athlete HM1 and the second shape information. The rendering processor 25 reads from the memory storage 15 the viewpoint information of the first athlete HM1 and the second shape information, and generates the first estimated image. The rendering processor 25 causes the memory storage 15 to store therein image data (first estimated image data) which indicates the generated first estimated image.

The rendering processor 25 generates the second estimated image in which an image of the first athlete HM1 viewed from the viewpoint of the second athlete HM2 is estimated (a three-dimensional model image in which the first athlete HM1 is 3D-modeled), using the viewpoint information of the second athlete HM2 and the second shape information. The rendering processor 25 reads from the memory storage 15 the viewpoint information of the second athlete HM2 and the second shape information, and generates the second estimated image. The rendering processor 25 causes the memory storage 15 to store therein image data (second estimated image data) which indicates the generated second estimated image.

Figure 13:
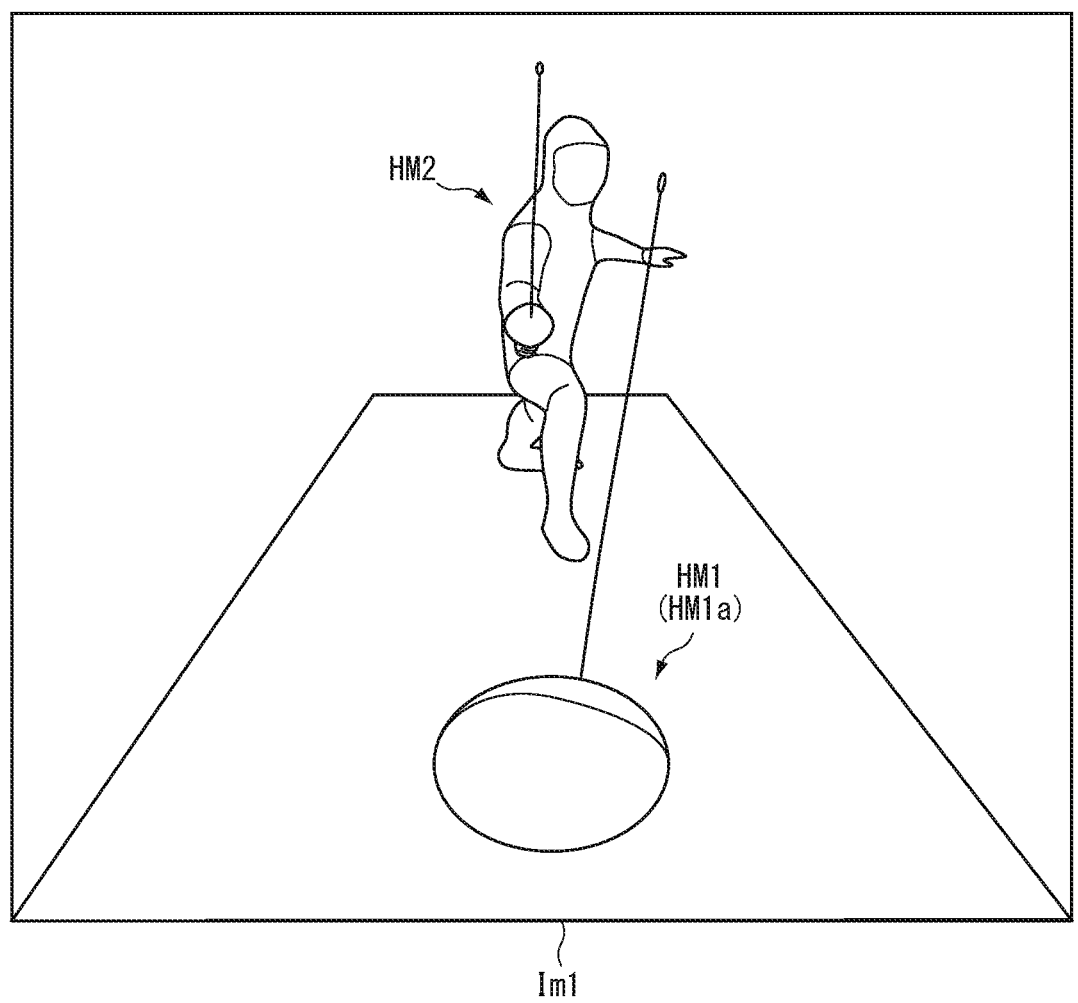
FIG. 13 is a diagram showing an estimated image viewed from a first viewpoint according to the sixth embodiment.

FIG. 13 is a diagram showing a first estimated image Im1 according to the sixth embodiment. Reference sign HM1a in FIG. 13 denotes a portion which includes the hand tip and the sword of the first athlete HM1 estimated to be within the viewing field of the first athlete HM1. In the first estimated image Im1, the portion HM1a of the first athlete HM1 is rendered superimposed on the second athlete HM2 estimated to be within the viewing field of the first athlete HM1. In the first estimated image Im1, the portion HM1a may be rendered in any of the following states, a transparent state (for example, outlines only), a semi-transparent state, and a non-transparent state. In the first estimated image Im1, the portion HM1a need not be rendered. Whether or not the portion HM1a is to be rendered, or the state of rendering (for example, transparent, semi-transparent, non-transparent) may be set, for example, by a user via the input device 33 and may be changed according to designation of the user.

Figure 14:
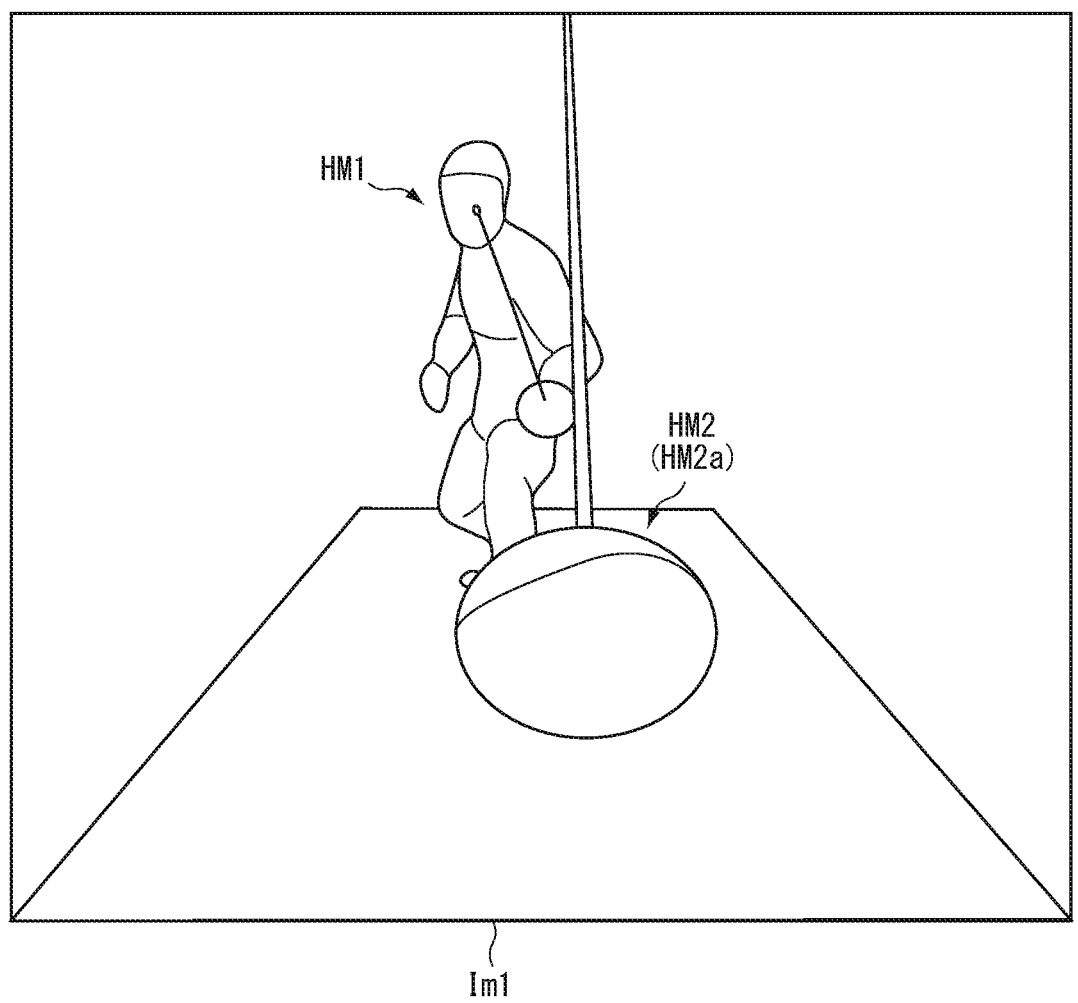
FIG. 14 is a diagram showing an estimated image viewed from a second viewpoint according to the sixth embodiment.

FIG. 14 is a diagram showing a second estimated image Im2 according to the sixth embodiment. Reference sign HM2a in FIG. 14 denotes a portion which includes the hand tip and the sword of the second athlete HM2 estimated to be within the viewing field of the second athlete HM2. In the second estimated image Im2, the portion HM2a of the second athlete HM2 is rendered superimposed on the first athlete HM1 estimated to be within the viewing field of the second athlete HM2. In the second estimated image Im2, the portion HM2a may be rendered in any of the following states, a transparent state (for example, outlines only), a semi-transparent state, and a non-transparent state. In the second estimated image Im2, the portion HM2a need not be rendered. Whether or not the portion HM2a is to be rendered or the state of rendering (for example, transparent, semi-transparent, non-transparent) may be set, for example, by the user via the input device 33 and may be changed according to designation of the user.

Returning to the description of FIG. 12, the detection device 1 according to the present embodiment causes, by means of the processing device 3, the display device 26 to display an image (hereunder, referred to as GUI image) representing a GUI (graphical user interface). The user can switch between images (still images, moving images) displayed on the GUI image by operating the input device (for example, keyboard, mouse) 33.

Figure 15:
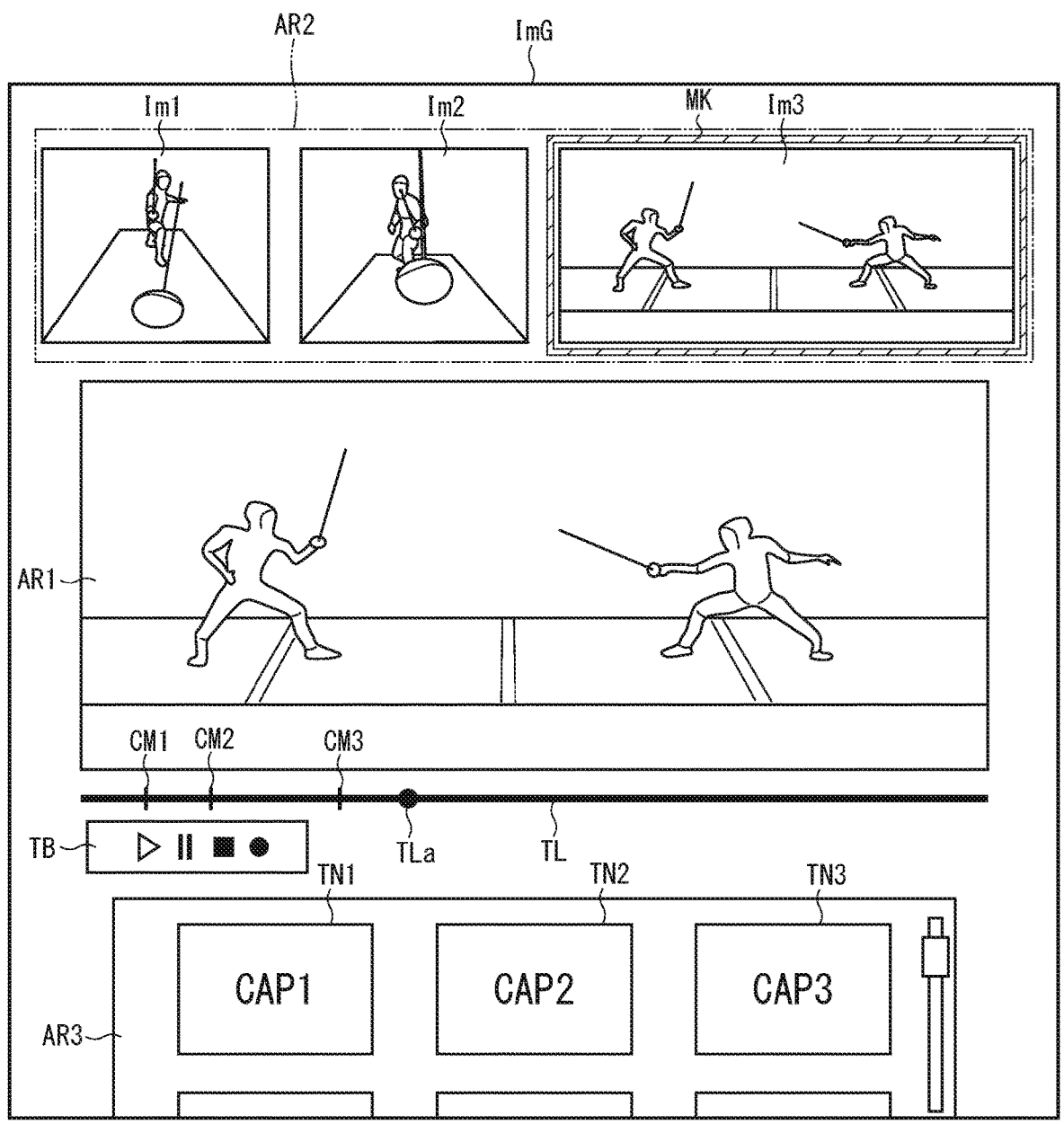
FIG. 15 is a diagram showing a GUI image according to the sixth embodiment.

FIG. 15 is a diagram showing a GUI image ImG according to the sixth embodiment. The GUI image ImG includes a first display region AR1, a second display region AR2, and a third display region AR3. The first display region AR1 (main region) is, for example, a region where an estimated image (for example, first estimated image Im1, second estimated image Im2, third estimated image Im3, and so forth) of an image viewed from a viewpoint selected by the user is arranged. The second display region AR2 (sub region) is a region where candidates of the estimated image to be arranged in the first display region AR1 (for example, a plurality of estimated images other than the estimated image being displayed in the main region) are arranged. The GUI image ImG is displayed on the display device 26 by the processing device 3.

In the second display region AR2, for example, the first estimated image Im1 (an image of the first viewing field), the second estimated image Im2 (an image of the second viewing field), and the third estimated image Im3 (an image of the third viewing field) are arranged. The third estimated image Im3 is, for example, an image of a viewing field different from those of the first estimated image Im1 and the second estimated image Im2 both. The third estimated image Im3 (for example, an overall image including the athlete and the athletic field) is an image generated in the viewing field (viewpoint, sight line) set by the user by the rendering processor 25 on the basis of the detection results of the plurality of detectors 30 (a three-dimensional model image in which the athletic field, the first athlete HM1, and the second athlete HM2 are 3D-modeled). The viewing field of the third estimated image Im3 is set, for example, to a viewing field in which both the first athlete HM1 and the second athlete HM2 would fit.

The user can select an estimated image to be arranged in the first display region AR1 from the first estimated image Im1, the second estimated image Im2, and the third estimated image Im3 arranged in the second display region AR2, for example, by operating the input device 33. Reference sign MK in FIG. 15 denotes a mark indicating the currently selected estimated image. For example, in FIG. 15, the mark MK is assigned to the third estimated image Im3 in the second display region AR2, and the third estimated image Im3 is being arranged and displayed in the first display region AR1. In the first display region AR1, the selected estimated image is arranged in a manner of being enlarged to a size larger than that in the second display region AR2. In the first display region AR1, the selected estimated image is displayed in a moving image format (for example, in real time). In the second display region AR2, each estimated image may be displayed in a moving image format (for example, in real time), or may be displayed in a still image format. As described above, by using the detection device of the present embodiment, the user can view each estimated image and switch between viewpoints in the three-dimensional space, allowing the user to visually grasp the posture of the athletes, the distance between the athletes, and so forth.

In FIG. 15, reference sign TL denotes a timeline bar which represents a period (period of time) from the start to the end of reproduction of the estimated image displayed in the first display region AR1. Reference sign TLa denotes a time mark which indicates a time in the currently displayed estimated image during the period from the start to the end of the estimated image. Reference sign TB denotes a tool box region where icons for allowing input of commands related to reproduction of the estimated image to be displayed in the first display region AR1 are arranged. Examples of the icons arranged in the tool box region TB include a triangle representing a command "start playback", a double line representing a command "pause playback", a rectangle representing a command "stop playback", and a circle representing a command "capture image".

The user can input the command to capture the currently displayed estimated image as a still image (capture command) by pressing with the mouse cursor the "circle" in the tool box region TB, for example, for an action of an athlete (for example, attack, defense, counter, point acquisition) or for a favorite image. Reference signs CM1 to CM3 each denote a time mark which represents, on the timeline bar TL, a time corresponding to the still image captured by the capture command. In the third display region AR3 a plurality of images, which are captured still images in a reduced size (for example, a thumbnail image TN1, a thumbnail image TN2, a thumbnail image TN3, and so forth), are displayed. For example, the thumbnail image TN1 ("CAP1") is a size-reduced still image corresponding to the time mark CM1. The thumbnail image TN2 ("CAP2") is a size-reduced still image corresponding to the time mark CM2. For example, the user can select the thumbnail image CM1 with the mouse cursor and display the still image corresponding to the thumbnail image CM1 in the first display region AR1 or in another window screen. On the timeline bar TL, reference signs CM1, CM2, and CM3 may each display, in addition to the time marks mentioned above, a comment included above the mark to indicate an action of each athlete. For example, the comment includes a comment obtained by the processing device 3 (for example, the rendering processor 25) analyzing the posture or the movement of an athlete (such as the first athlete HM1) in the estimated image on the basis of the estimated image, and examples of the comment include attack, defense, counter, and point acquisition of athlete.

In the embodiment described above, the processing device 3 includes, for example, a computer system. The processing device 3 reads out a detection program stored in the memory storage 15, and executes various processes in accordance with this detection program. This detection program causes a computer to execute process including: generating first shape information representing a first shape of a target object, on the basis of a depth from a predetermined point to each point on the surface of the target object obtained by irradiating light onto the target object and detecting light emitted from the target object; specifying a portion in the first shape on the basis of the first shape information; and adding a second shape, which is based on information different from the depth serving as the base of the first shape information, to the first shape so as to be at a preliminarily set relative position with respect to the portion specified, and generating second shape information representing a shape including the first shape and the second shape. This detection program may be recorded and provided on a computer-readable storage medium (for example, a non-transitory tangible medium).

The technical scope of the present invention is not limited to the modes described in the above embodiment and so forth. One or more of the requirements described in the above embodiments and so forth may be omitted. One or more of the requirements described in the above embodiments and so forth may also be combined where appropriate. Furthermore, the contents of all documents cited in the detailed description of the present invention are incorporated herein by reference to the extent permitted by law.

DESCRIPTION OF REFERENCE SIGNS

1 Detection device
2 First detector
3 Processing device
11 First shape information generator
12 Portion specifier
13 Second shape information generator
15 Memory storage
21 Second detector
23 Sensor
25 Rendering processor
D1 First shape information
D2 Second shape information
EM Identifier
EQ Equipment
HM Human body
OB Target object
V1, V2 Viewpoint
COM Computer
EQ1 First portion
EQ2 Second portion
FM1 First shape
FM2 Second shape

What is claimed is:

1. A processing device comprising:
an obtainer that obtains first distance information that is detected information of a distance to a target object;
a first generator that generates first shape information that indicates a shape of the target object based on the first distance information;
a memory storage that stores additional shape information that indicates an additional shape to be added at a relative position preliminarily set with respect to a portion of the shape of the target object; and
a second generator that generates combined shape information in which the additional shape is added to the shape of the target object at the relative position; wherein
the additional shape information is generated based on information that is different from the first distance information.

2. The processing device according to claim 1, wherein the portion of the shape of the target object is set based on reliability of detection when detecting the target object.

3. The processing device according to claim 1, wherein the additional shape information is generated on a computer without being based on information of a distance to the target object.

4. The processing device according to claim 1, wherein the additional shape information is generated based on second distance information that is detected information of a distance to the target object, the second distance information being detected under conditions that differ from detection conditions under which the first distance information is detected.

5. The processing device according to claim 4, wherein the first distance information is detected by irradiating infrared light onto the target object, and
the second distance information is detected by capturing images of the target object from viewpoints different from each other.

6. A system comprising:
the processing device according to claim 1, and
a display device that displays an estimated image represented by the first shape information and the additional shape information.

7. The system according to claim 6, wherein
the display device changes an additional shape estimated image represented by the additional shape, the additional shape estimated image being changed based on a change in the first shape information and not displaying a first shape estimated image represented by the first shape information.

8. The system according to claim 6, comprising
a detection device that detects information of a distance to the target object.

9. The processing device according to claim 1, wherein
the portion of the shape includes a plurality of portions which are preliminarily set in the shape of the target object; and
the additional shape is added so as to be in a relative position preliminarily set with respect to the plurality of portions.

10. The processing device according to claim 1, wherein the portion of the shape is a portion determined based on a preliminary determined shape.

11. The processing device according to claim 1, wherein the portion of the shape is a portion that is distinguishable from other portions in the shape of the target object.

12. The processing device according to claim 1, wherein the additional shape to replace the portion of the shape of the target object.

13. The processing device according to claim 1, wherein the portion of the target object is a portion that corresponds to at least any portion of human body selected from the group consisting of a distal part, a joint, a head, and a face.

14. The processing device according to claim 1, comprising a portion specifier, wherein
the portion specifier is configured to specify the portion of the shape of the target object by at least one of recognition processings selected from the group consisting of a pattern recognition processing, a shape recognition processing, and a skeletal recognition processing.

15. A method comprising:
- obtaining distance information that is detected information of a distance to a target object;
- generating shape information that indicates a shape of the target object based on the distance information;
- storing additional shape information that indicates an additional shape to be added at a relative position preliminarily set with respect to a portion of the shape of the target object; and
- generating combined shape information in which the additional shape is added to the shape of the target object at the relative position.

16. A non-transitory computer readable medium, the medium including a program which causes a computer to execute the method according to claim 15.

* * * * *